US011539956B2

(12) United States Patent
Li et al.

(10) Patent No.: US 11,539,956 B2
(45) Date of Patent: *Dec. 27, 2022

(54) ROBUST ENCODING/DECODING OF ESCAPE-CODED PIXELS IN PALETTE MODE

(71) Applicant: Microsoft Technology Licensing, LLC, Redmond, WA (US)

(72) Inventors: Bin Li, Beijing (CN); Jizheng Xu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/849,286

(22) Filed: Apr. 15, 2020

(65) Prior Publication Data

US 2020/0244962 A1 Jul. 30, 2020

Related U.S. Application Data

(63) Continuation of application No. 15/735,134, filed as application No. PCT/CN2015/081039 on Jun. 9, 2015, now Pat. No. 10,659,783.

(51) Int. Cl.
*H04N 19/146* (2014.01)
*H04N 19/184* (2014.01)
(Continued)

(52) U.S. Cl.
CPC ........... *H04N 19/124* (2014.11); *H04N 19/13* (2014.11); *H04N 19/157* (2014.11);
(Continued)

(58) Field of Classification Search
CPC .... H04N 19/124; H04N 19/182; H04N 19/13; H04N 19/91; H04N 19/593;
(Continued)

(56) References Cited

U.S. PATENT DOCUMENTS

| 5,488,570 A * | 1/1996 | Agarwal | H04N 19/197 |
| | | | 375/E7.193 |
| 6,292,194 B1 * | 9/2001 | Powell, III | G06T 11/001 |
| | | | 345/582 |

(Continued)

FOREIGN PATENT DOCUMENTS

WO WO 2014/050030 4/2014

OTHER PUBLICATIONS

Zhan Ma, Advanced Screen Content Coding Using Color Table and Index Map. IEEE, 2014 (Year: 2014).*

(Continued)

*Primary Examiner* — Philip P. Dang
(74) *Attorney, Agent, or Firm* — Klarquist Sparkman, LLP

(57) ABSTRACT

Approaches to robust encoding and decoding of escape-coded pixels in a palette mode are described. For example, sample values of escape-coded pixels in palette mode are encoded/decoded using a binarization process that depends on a constant value of quantization parameter ("QP") for the sample values. Or, as another example, sample values of escape-coded pixels in palette mode are encoded/decoded using a binarization process that depends on sample depth for the sample values. Or, as still another example, sample values of escape-coded pixels in palette mode are encoded/decoding using a binarization process that depends on some other fixed rule. In example implementations, these approaches avoid dependencies on unit-level QP values when parsing the sample values of escape-coded pixels, which can make encoding/decoding more robust to data loss.

17 Claims, 15 Drawing Sheets

(51) Int. Cl.

| | |
|---|---|
| *H04N 19/124* | (2014.01) |
| *H04N 19/593* | (2014.01) |
| *H04N 19/157* | (2014.01) |
| *H04N 19/182* | (2014.01) |
| *H04N 19/13* | (2014.01) |
| *H04N 19/91* | (2014.01) |
| *H04N 19/70* | (2014.01) |
| *H04N 19/46* | (2014.01) |
| *H04N 19/186* | (2014.01) |
| *H04N 19/174* | (2014.01) |

(52) U.S. Cl.
CPC ......... *H04N 19/182* (2014.11); *H04N 19/593* (2014.11); *H04N 19/91* (2014.11); *H04N 19/174* (2014.11); *H04N 19/186* (2014.11); *H04N 19/46* (2014.11); *H04N 19/70* (2014.11)

(58) Field of Classification Search
CPC .... H04N 19/157; H04N 19/174; H04N 19/70; H04N 19/46; H04N 19/186
See application file for complete search history.

(56) References Cited

U.S. PATENT DOCUMENTS

| | | | | |
|---|---|---|---|---|
| 6,400,893 | B1* | 6/2002 | Murase | G11B 27/034 386/346 |
| 7,016,547 | B1* | 3/2006 | Smirnov | H03M 7/4006 375/E7.161 |
| 7,072,512 | B2* | 7/2006 | Mehrotra | G06T 9/00 375/E7.137 |
| 7,085,420 | B2* | 8/2006 | Mehrotra | G06T 9/00 382/234 |
| 7,218,790 | B2* | 5/2007 | Smirnov | H04N 19/13 382/233 |
| 7,340,103 | B2* | 3/2008 | Smirnov | H04N 19/13 382/233 |
| 7,496,143 | B2* | 2/2009 | Schwarz | H04N 19/136 375/240.18 |
| 7,965,861 | B2* | 6/2011 | Agaian | G06T 1/0078 382/100 |
| 8,170,101 | B2* | 5/2012 | Lei | H04N 19/194 375/348 |
| 8,369,568 | B2* | 2/2013 | Agaian | G06T 1/0028 382/100 |
| 8,472,792 | B2* | 6/2013 | Butt | H04N 19/85 348/700 |
| 8,731,369 | B2* | 5/2014 | Li | H04N 5/278 386/244 |
| 9,270,988 | B2* | 2/2016 | Lou | H04N 19/645 |
| 9,516,342 | B2* | 12/2016 | Gisquet | H04N 19/593 |
| 9,591,325 | B2 | 3/2017 | Li et al. | |
| 9,609,336 | B2* | 3/2017 | Topiwala | H04N 19/115 |
| 9,641,835 | B2* | 5/2017 | Lou | H04N 19/60 |
| 9,654,806 | B2* | 5/2017 | Zou | H04N 19/80 |
| 9,699,468 | B2 | 7/2017 | Guo et al. | |
| 9,704,270 | B1* | 7/2017 | Main | G06T 15/60 |
| 9,787,989 | B2* | 10/2017 | Nguyen | H04N 19/14 |
| 9,788,004 | B2* | 10/2017 | Sun | H04N 19/50 |
| 9,924,175 | B2* | 3/2018 | Pu | H04N 19/117 |
| 10,021,403 | B2* | 7/2018 | Kolesnikov | H04N 19/176 |
| 10,038,915 | B2* | 7/2018 | Joshi | H04N 19/93 |
| 10,062,181 | B1* | 8/2018 | Longhurst | G06T 7/13 |
| 10,129,540 | B2* | 11/2018 | Budagavi | H04N 19/176 |
| 10,136,141 | B2* | 11/2018 | Pu | H04N 19/176 |
| 10,230,983 | B2* | 3/2019 | Liu | H04N 19/13 |
| 10,237,575 | B2* | 3/2019 | Tsai | H04N 19/593 |
| 10,264,285 | B2* | 4/2019 | Joshi | H04N 19/129 |
| 10,368,091 | B2 | 7/2019 | Li et al. | |
| 10,390,034 | B2 | 8/2019 | Zhu et al. | |
| 10,469,863 | B2 | 11/2019 | Zhu et al. | |
| 10,506,254 | B2 | 12/2019 | Li et al. | |
| 10,582,213 | B2 | 3/2020 | Li et al. | |
| 10,652,573 | B2 | 5/2020 | Sugio et al. | |
| 10,652,576 | B2 | 5/2020 | Li et al. | |
| 10,659,783 | B2 | 5/2020 | Li et al. | |
| 10,785,486 | B2 | 9/2020 | Li et al. | |
| 10,812,817 | B2 | 10/2020 | Li et al. | |
| 11,109,036 | B2 | 8/2021 | Li et al. | |
| 11,172,207 | B2 | 11/2021 | Li et al. | |
| 11,252,437 | B2 | 2/2022 | Li et al. | |
| 11,284,103 | B2 | 3/2022 | Zhu et al. | |
| 11,317,113 | B2 | 4/2022 | Li et al. | |
| 11,363,283 | B2 | 6/2022 | Li et al. | |
| 2004/0022444 | A1* | 2/2004 | Rhoads | G06V 20/80 382/232 |
| 2013/0114698 | A1* | 5/2013 | Lou | H04N 19/18 375/240.03 |
| 2013/0182774 | A1 | 7/2013 | Wang et al. | |
| 2013/0294524 | A1* | 11/2013 | Van Der Auwera | H04N 19/60 375/240.18 |
| 2014/0003497 | A1* | 1/2014 | Sullivan | H04N 19/126 375/240.03 |
| 2014/0003498 | A1* | 1/2014 | Sullivan | H04N 19/186 375/240.03 |
| 2015/0237356 | A1* | 8/2015 | Wu | H04N 19/174 375/240.03 |
| 2015/0262404 | A1* | 9/2015 | Laude | H04N 19/124 375/240.12 |
| 2015/0264348 | A1* | 9/2015 | Zou | H04N 19/593 375/240.02 |
| 2015/0326864 | A1* | 11/2015 | Lainema | H04N 19/186 375/240.25 |
| 2015/0341635 | A1* | 11/2015 | Seregin | H04N 19/176 375/240.16 |
| 2015/0341655 | A1* | 11/2015 | Joshi | H04N 19/50 375/240.16 |
| 2015/0341656 | A1* | 11/2015 | Seregin | H04N 19/176 375/240.12 |
| 2015/0341674 | A1* | 11/2015 | Seregin | H04N 19/93 375/240.12 |
| 2016/0057430 | A1* | 2/2016 | Kolesnikov | H04N 19/103 375/240.12 |
| 2016/0112713 | A1* | 4/2016 | Russell | H04N 19/20 375/240.09 |
| 2016/0309172 | A1* | 10/2016 | Laroche | H04N 19/94 |
| 2016/0309177 | A1* | 10/2016 | Laroche | H04N 19/182 |
| 2016/0316214 | A1* | 10/2016 | Gisquet | H04N 19/176 |
| 2016/0323591 | A1 | 11/2016 | Chuang et al. | |
| 2016/0373788 | A1* | 12/2016 | Gamei | H04N 19/61 |
| 2017/0026641 | A1 | 1/2017 | Lai et al. | |
| 2017/0127058 | A1* | 5/2017 | Misra | H04N 19/463 |
| 2017/0127090 | A1* | 5/2017 | Rosewarne | H04N 19/86 |
| 2017/0180737 | A1* | 6/2017 | Ye | H04N 19/119 |
| 2017/0302939 | A1 | 10/2017 | Guo et al. | |
| 2018/0146197 | A1* | 5/2018 | Yi | H04N 19/124 |
| 2020/0084472 | A1 | 3/2020 | Li et al. | |
| 2020/0092579 | A1 | 3/2020 | Zhu et al. | |
| 2020/0228834 | A1 | 7/2020 | Li et al. | |
| 2020/0244962 | A1 | 7/2020 | Li et al. | |
| 2020/0404301 | A1 | 12/2020 | Li et al. | |
| 2021/0360262 | A1 | 11/2021 | Li et al. | |
| 2022/0030251 | A1 | 1/2022 | Li et al. | |
| 2022/0132163 | A1 | 4/2022 | Li et al. | |
| 2022/0264131 | A1 | 8/2022 | Li et al. | |

OTHER PUBLICATIONS

Y-J Chang; JCTVC-P0153—Non-RCE4: Major color table (palette) sharing; Jan. 9-17, 2014 (Year: 2014).*

Y-J Chang; JCTVC-P0256—Non-RCE3: Vertical padding scheme for intra block copy; Jan. 9-17, 2014 (Year: 2014).*

Communication pursuant to Article 94(3) EPC dated Jan. 7, 2020, from European Patent Application No. 14903497.7, 4 pp.

Communication under Rule 71(3) EPC dated Jan. 9, 2020, from European Patent Application No. 13895646.1, 7 pp.

Final Office Action dated Mar. 9, 2020, from U.S. Appl. No. 15/515,559, 16 pp.

First Examination Report dated Jun. 30, 2020, from Indian Patent Application No. 201747008352, 6 pp.

(56) References Cited

OTHER PUBLICATIONS

Notice of Allowance dated Jan. 14, 2020, from U.S. Appl. No. 16/683,065, 14 pp.
Notice of Reasons for Refusal dated Jun. 8, 2020, from Japanese Patent Application No. 2019-094546, 8 pp.
Notice on Grant of Patent dated Mar. 11, 2020, from Chinese Patent Application No. 201580043420.0, 4 pp.
Office Action dated Mar. 3, 2020, from Mexican Patent Application No. MX/a/2017/004211, 7 pp.
Office Action dated Mar. 24, 2020, from Korean Patent Application No. 10-2016-7027340, 24 pp.
Office Action dated Apr. 30, 2020, from Indian Patent Application No. 201647028727, 7 pp.
Pang et al., "Intra block copy with larger search region," JCTVC-Q0139, 8 pp. (Mar. 2014).
Summons to Attend Oral Proceedings dated Mar. 20, 2020, from European Patent Application No. 14884822.9, 6 pp.
Yazdanpanah et al., "A Simple Lossless Preprocessing Algorithm for Hardware Implementation of DEFLATE Data Compression," *Proc. Iranian Conf. on Electrical Engineering*, 5 pp. (May 2011).
Chang et al., "Non-RCE3: Vertical padding scheme for intra block copy," JCTVC-P0256, 5 pp. (Jan. 2014).
Decision to Grant a Patent dated Oct. 13, 2020, from Japanese Patent Application No. 2019-094546, 5 pp.
Examiner's Report dated Nov. 6, 2020, from Canadian Patent Application No. 2,959,682, 3 pp.
First Examination Report dated Oct. 5, 2020, from Indian Patent Application No. 20171704313 8, 7 pp.
Lai et al., "Non-RCE4: Major Color Table (Palette) Sharing," JCTVC-P0153, 6 pp. (Jan. 2014).
Notification of Reason for Refusal dated Oct. 8, 2020, from Korean Patent Application No. 10-2016-7010998, 12 pp.
Office Action dated Oct. 12, 2020, from Korean Patent Application No. 10-2017-7011675, 12 pp. [No English translation].
Extended European Search Report dated Aug. 24, 2020, from European Patent Application No. 20177289.4, 10 pp.
Office Action dated Jun. 28, 2020, from Brazilian Patent Application No. 112017004041-7, 4 pp.
Communication under Rule 71(3) EPC dated Mar. 12, 2021, from European Patent Application No. 14903497.7, 7 pp.
Examiner's Report dated May 28, 2021, from Canadian Patent Application No. 2,959,682, 3 pp.
Notice of Allowance dated Apr. 7, 2021, from Korean Patent Application No. 10-2016-7010998, 6 pp.
Notification of Reason for Refusal dated May 4, 2021, from Korean Patent Application No. 10-2021-7010079, 14 pp.
Communication pursuant to Rules 70(2) and 70a(2) EPC and reference to Rule 39(1) EPC dated Dec. 6, 2021, from European Patent Application No. 21186125.7, 2 pp.
Extended European Search Report dated Nov. 3, 2021, from European Patent Application No. 21186125.7, 11 pp.
Notice of Allowance dated Jul. 29, 2021, from Korean Patent Application No. 10-2021-7020291, 6 pp.
Notice of Allowance dated Aug. 20, 2021, from Korean Patent Application No. 10-2021-7010079, 6 pp.
Notice of Allowance dated Oct. 6, 2021, from U.S. Appl. No. 16/828,799, 14 pp.
Office Action dated Nov. 12, 2021, from U.S. Appl. No. 17/009,495, 14 pp.
Notice of Allowance dated Jan. 25, 2021, from Korean Patent Application No. 10-2017-7011675, 7 pp.
U.S. Appl. No. 17/739,299, filed May 9, 2022.
U.S. Appl. No. 17/691,802, filed Mar. 10, 2022.
U.S. Appl. No. 17/751,392, filed May 23, 2022.
U.S. Appl. No. 17/581,446, filed Jan. 21, 2022.
Notice of Allowance dated Feb. 3, 2022, from U.S. Appl. No. 17/009,495, 6 pp.
Notice of Allowance dated May 11, 2022, from Canadian Patent Application No. 2,959,682, 1 p.

* cited by examiner software 180 implementing one or more innovations for robust encoding/decoding of escape-coded pixels in palette mode

400

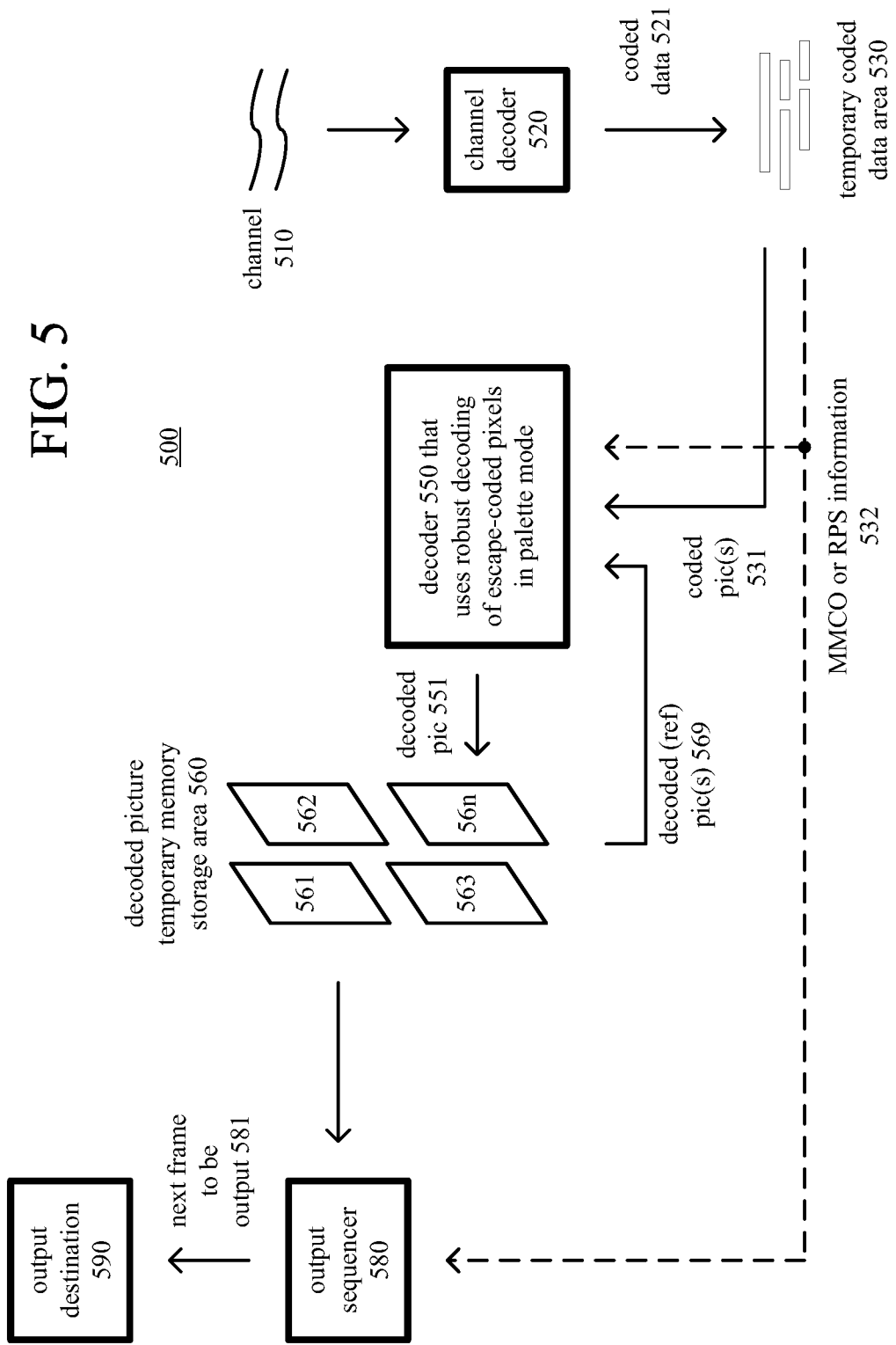

index map (830) of index values for 4x4 unit

| 0 | 4 | 4 | 2 |
|---|---|---|---|
| 0 | 0 | 1 | 2 |
| 3 | 0 | 1 | 2 |
| 3 | 3 | 1 | 2 | palette (820)

index value: base color
0: (200, 120, 93)
1: (168, 101, 28)
2: (127, 127, 127)
3: (41, 41, 41)
4: escape list (840) of quantized sample values
escape-coded
sample values (quantized): 8, 7, 10, 13, 8, 17 mapping with palette (820), coding escape-coded pixels blocks of sample values for 4x4 unit (810)

| 200 | 100 | 155 | 127 |
|-----|-----|-----|-----|
| 200 | 200 | 168 | 127 |
| 41  | 200 | 168 | 127 |
| 41  | 41  | 168 | 127 |

| 120 | 80  | 91  | 127 |
|-----|-----|-----|-----|
| 120 | 120 | 101 | 127 |
| 41  | 120 | 101 | 127 |
| 41  | 41  | 101 | 127 |

| 93 | 120 | 200 | 127 |
|----|-----|-----|-----|
| 93 | 93  | 28  | 127 |
| 41 | 93  | 28  | 127 |
| 41 | 41  | 28  | 127 | index map (830) of index values for 4x4 unit

| 0 | 4 | 4 | 2 |
|---|---|---|---|
| 0 | 0 | 1 | 2 |
| 3 | 0 | 1 | 2 |
| 3 | 3 | 1 | 2 | palette (820)

index value:  base color
0: (200, 120, 93)
1: (168, 101, 28)
2: (127, 127, 127)
3: (41, 41, 41)
4: escape list (840) of quantized sample values
escape-coded
sample values (quantized):  8, 7, 10, 13, 8, 17 reverse mapping with palette (820), decoding escape-coded pixels reconstructed blocks of sample values for 4x4 unit (810)

| 200 | 96 | 156 | 127 |
|---|---|---|---|
| 200 | 200 | 168 | 127 |
| 41 | 200 | 168 | 127 |
| 41 | 41 | 168 | 127 |

| 120 | 84 | 96 | 127 |
|---|---|---|---|
| 120 | 120 | 101 | 127 |
| 41 | 120 | 101 | 127 |
| 41 | 41 | 101 | 127 |

| 93 | 120 | 204 | 127 |
|---|---|---|---|
| 93 | 93 | 28 | 127 |
| 41 | 93 | 28 | 127 |
| 41 | 41 | 28 | 127 |

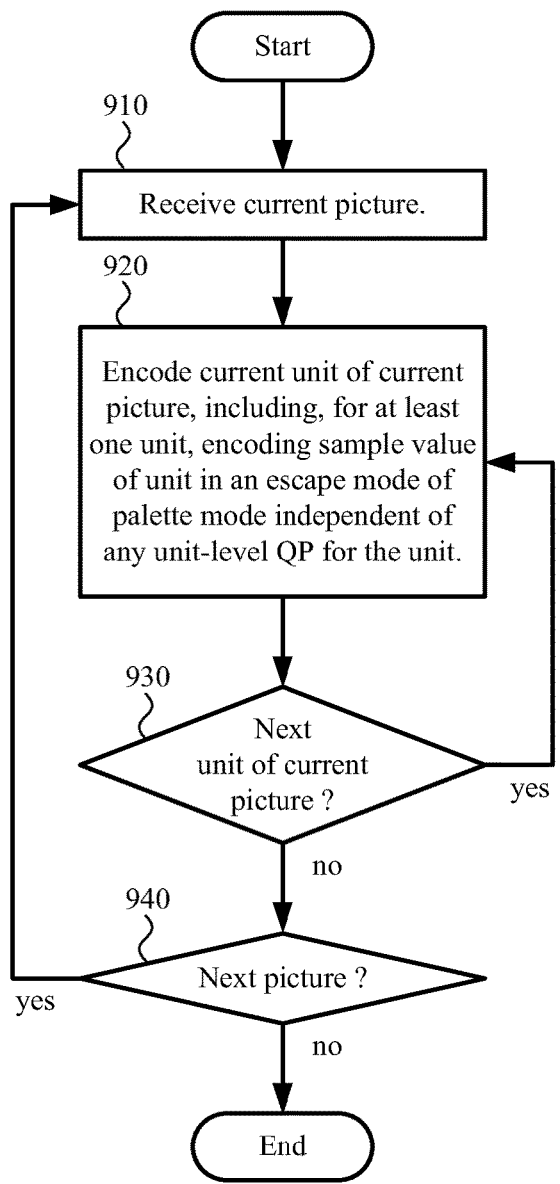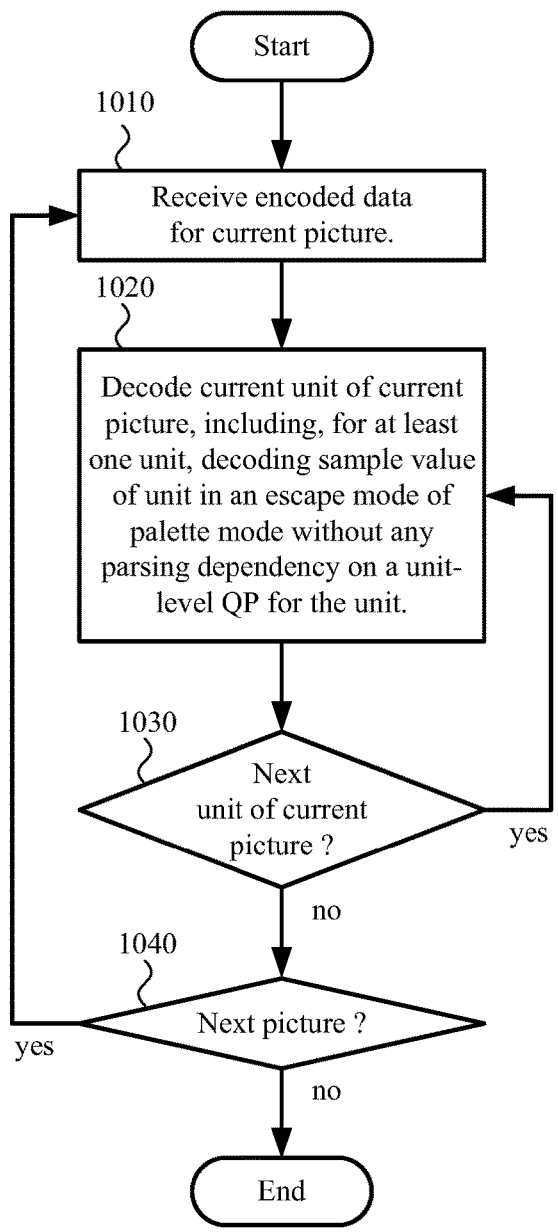

| slice_segment_header( ) { | Descriptor |
|---|---|
| ... | |
|    slice_qp_delta | se(v) |
|    if( pps_slice_chroma_qp_offsets_present_flag ) { | |
|       slice_cb_qp_offset | se(v) |
|       slice_cr_qp_offset | se(v) |
|    } | |
|    if( pps_slice_act_qp_offsets_present_flag ) { | |
|       slice_act_y_qp_offset | se(v) |
|       slice_act_cb_qp_offset | se(v) |
|       slice_act_cr_qp_offset | se(v) |
|    } | |
|    if ( palette_mode_enabled_flag ) { | |
|       palette_escape_pixel_qp_delta | se(v) |
|       if ( ChromaArrayType != 0 ) { | |
|          palette_escape_pixel_cb_qp_offset | se(v) |
|          palette_escape_pixel_cr_qp_offset | se(v) |
|       } | |
|    } | |
|    if( chroma_qp_offset_list_enabled_flag ) | |
|       cu_chroma_qp_offset_enabled_flag | u(1) |
|    if( deblocking_filter_override_enabled_flag ) | |
|       deblocking_filter_override_flag | u(1) |
| ... | |

```
absV = Abs( symbolVal )
stopLoop = 0
do
    if( absV >= ( 1 << k ) ) {
        put( 1 )
        absV = absV – ( 1 << k )
        k++
    } else {
        put( 0 )
        while( k-- )
            put( ( absV >> k ) & 1 )
        stopLoop = 1
    }
while( !stopLoop )
```

ROBUST ENCODING/DECODING OF ESCAPE-CODED PIXELS IN PALETTE MODE

CROSS REFERENCE TO RELATED APPLICATIONS

This application is a continuation of U.S. patent application Ser. No. 15/735,134, filed Dec. 8, 2017, which is the U.S. National Stage of International Application No. PCT/CN2015/081039, filed Jun. 9, 2015, which was published in English under PCT Article 21(2), and which is incorporated by reference herein in its entirety.

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last 25 years, various video codec standards have been adopted, including the ITU-T H.261, H.262 (MPEG-2 or ISO/IEC 13818-2), H.263, H.264 (MPEG-4 AVC or ISO/IEC 14496-10) standards, the MPEG-1 (ISO/IEC 11172-2) and MPEG-4 Visual (ISO/IEC 14496-2) standards, and the SMPTE 421M (VC-1) standard. More recently, the H.265/HEVC standard (ITU-T H.265 or ISO/IEC 23008-2) has been approved. Extensions to the H.265/HEVC standard (e.g., for scalable video coding/decoding, for coding/decoding of video with higher fidelity in terms of sample bit depth or chroma sampling rate, for screen capture content, or for multi-view coding/decoding) are currently under development. A video codec standard typically defines options for the syntax of an encoded video bitstream, detailing parameters in the bitstream when particular features are used in encoding and decoding. In many cases, a video codec standard also provides details about the decoding operations a video decoder should perform to achieve conforming results in decoding. Aside from codec standards, various proprietary codec formats define other options for the syntax of an encoded video bitstream and corresponding decoding operations.

Different codec standards and formats support various coding/decoding tools. Palette mode is a coding/decoding tool under consideration for extensions of the H.265/HEVC standard for encoding/decoding of screen capture content. Palette mode can be helpful when encoding certain "artificially" created video content such as screen-capture content. Screen-capture content typically includes repeated structures (e.g., graphics, text characters) that use few distinct colors, compared to natural video. This provides opportunities for palette mode to improve performance. In general, in palette mode, a video encoder encodes pixels using index values that represent base colors in a palette. A pixel, in general, includes one or more sample values for a location in a picture. Each of the index values is associated with a different value ("base color") among the colors of a unit. For example, if an 8×8 unit has four different colors among the 64 pixels of the unit, the encoder assigns four different index values for those four base colors. During encoding, the pixels are replaced with corresponding index values. The encoder encodes and signals a palette, which maps index values to base colors, as well as data for the arrangement of index values representing the pixels ("index map"). A decoder receives and decodes the palette and index map. Using that information, the decoder replaces index values in the index map with base colors for the original pixels.

In some designs of palette mode, rare colors can be encoded and decoded in escape mode. In escape mode, a pixel is not represented using a base color in a palette. Instead, a special index value marks the pixel for encoding and decoding in escape mode. Each sample value for the escape-coded pixel is quantized, which maps the sample value to one of a set of "bins" in order to approximate the sample value, and entropy coded, which typically reduces the number of bits used to represent the quantized sample value. In current designs of escape mode of the palette mode in the H.265/HEVC standard, entropy coding of quantized sample values results in encoded data that is not robust to certain types of data loss. In particular, transmission errors (e.g., due to bit flips in encoded data) can lead to severe quality degradation in reconstructed pixels.

SUMMARY

In summary, the detailed description presents innovations in robust encoding and decoding of escape-coded pixels in a palette mode. For example, sample values of escape-coded pixels in palette mode are encoded/decoded using a binarization process that depends on a constant value of quantization parameter ("QP") for the sample values. Or, as another example, sample values of escape-coded pixels in palette mode are encoded/decoded using a binarization process that depends on sample depth for the sample values. Or, as still another example, sample values of escape-coded pixels in palette mode are encoded/decoding using a binarization process that depends on some other fixed rule. In example implementations, these approaches avoid dependencies on unit-level QP values when parsing the sample values of escape-coded pixels, which can make encoding/decoding more robust to data loss.

According to one aspect of the innovations described herein, a media encoder such as a video encoder or image encoder receives and encodes a picture. As part of encoding the picture, the media encoder encodes a unit of the picture in a palette mode. In doing so, the media encoder encodes a sample value of the unit in an escape mode of the palette mode independent of any unit-level QP for the unit.

According to another aspect of the innovations described herein, a media decoder such as a video decoder or image decoder receives encoded data for a picture and decodes the picture. As part of decoding the picture, the media decoder decodes a unit of the picture in a palette mode. In doing so, the media decoder decodes a sample value of the unit in an escape mode of the palette mode without any parsing dependency on a unit-level QP for the unit.

The innovations can be implemented as part of a method, as part of a computing system configured to perform the method or as part of a tangible computer-readable media storing computer-executable instructions for causing a computing system to perform the method. The various innovations can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

BRIEF DESCRIPTION OF THE DRAWINGS

FIG. 5 is a diagram of an example decoder system in conjunction with which some described embodiments can be implemented.

FIGS. 9 and 10 are flowcharts illustrating generalized techniques for encoding and decoding, respectively, that includes robust coding/decoding of pixels in escape mode of palette mode.

FIG. 13 is a table illustrating example syntax for signaling of slice-level QP offsets for escape-coded pixels in palette mode.

FIG. 18 is a pseudocode listing illustrating an example technique for a $k^{th}$-order Exponential-Golomb binarization process.

DETAILED DESCRIPTION

The detailed description presents innovations in robust encoding and decoding of escape-coded pixels in a palette mode. For example, sample values of escape-coded pixels in palette mode are encoded/decoded using a binarization process that depends on a constant value of quantization parameter ("QP") for the sample values. Or, as another example, sample values of escape-coded pixels in palette mode are encoded/decoded using a binarization process that depends on sample depth for the sample values. Or, as still another example, sample values of escape-coded pixels in palette mode are encoded/decoding using a binarization process that depends on some other fixed rule. In example implementations, these approaches avoid dependencies on unit-level QP values when parsing the sample values of escape-coded pixels, which can make encoding/decoding more robust to data loss.

Some of the innovations described herein are illustrated with reference to terms specific to the H.265/HEVC standard and extensions of the H.265/HEVC standard. For example, some of the innovations are described as changes relative to features of the document JCTVC-T1005-v2, which is entitled, "High Efficiency Video Coding (HEVC) Screen Content Coding: Draft 3." The innovations described herein can also be implemented for other video codec standards or formats (e.g., the VP9 format, H.264/AVC standard). Or, the innovations described herein can be implemented for an image codec standard or format.

In the examples described herein, identical reference numbers in different figures indicate an identical component, module, or operation. Depending on context, a given component or module may accept a different type of information as input and/or produce a different type of information as output.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems.

Figure 1:
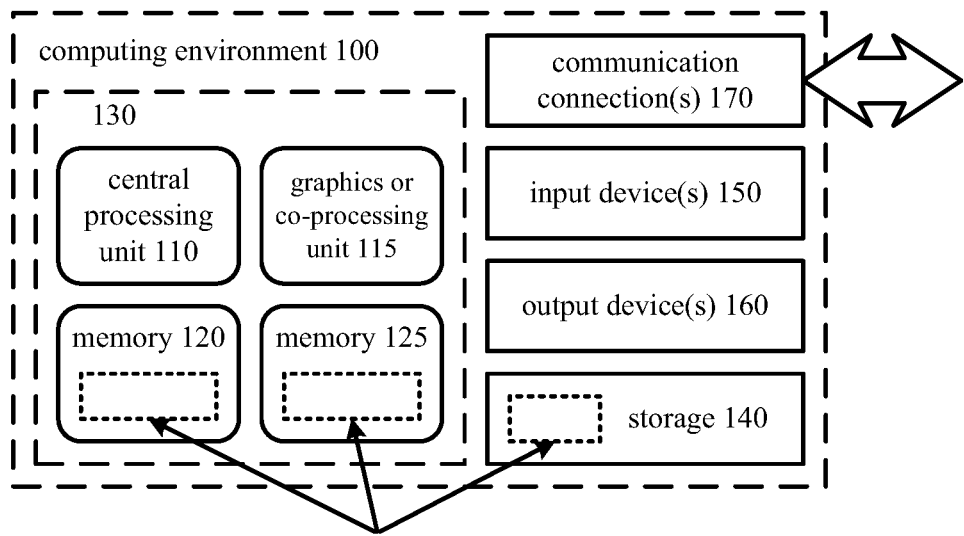
FIG. 1 is a diagram illustrating an example computing system in which some described embodiments can be implemented.

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for robust encoding/decoding of escape-coded pixels in palette mode, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, optical media such as CD-ROMs or DVDs, or any other medium which can be used to store information and which can be accessed within the computing system (100). The storage (140) stores instructions for the software (180) implementing one or more innovations for robust encoding/decoding of escape-coded pixels in palette mode.

The input device(s) (150) may be a touch input device such as a keyboard, mouse, pen, or trackball, a voice input device, a scanning device, or another device that provides input to the computing system (100). For video, the input device(s) (150) may be a camera, video card, screen capture module, TV tuner card, or similar device that accepts video input in analog or digital form, or a CD-ROM or CD-RW that reads video input into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations thereof. As used herein, the term computer-readable media does not include transitory signals or propagating carrier waves.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC such as an ASIC digital signal processor ("DSP"), a graphics processing unit ("GPU"), or a programmable logic device ("PLD") such as a field programmable gate array ("FPGA")) specially designed or configured to implement any of the disclosed methods.

For the sake of presentation, the detailed description uses terms like "determine" and "evaluate" to describe computer operations in a computing system. These terms are high-level abstractions for operations performed by a computer, and should not be confused with acts performed by a human being. The actual computer operations corresponding to these terms vary depending on implementation.

II. Example Network Environments.

Figure 2A:
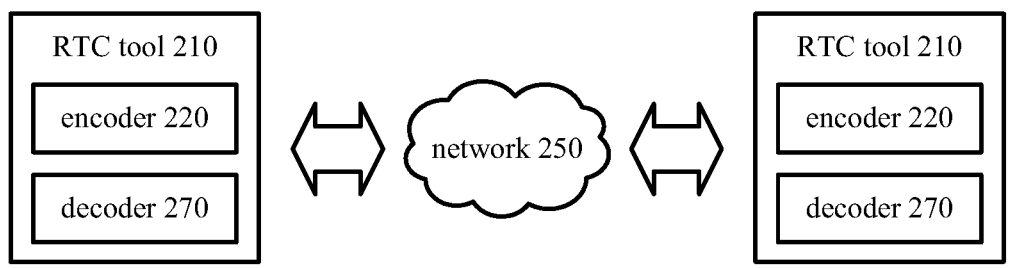
FIGS. 2a and 2b are diagrams illustrating example network environments in which some described embodiments can be implemented.
Figure 2B:
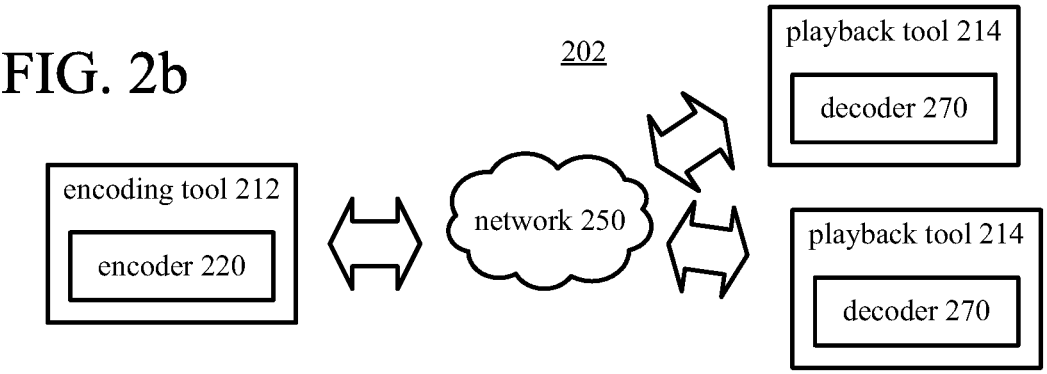

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with a variation or extension of the H.265/HEVC standard, SMPTE 421M standard, ISO/IEC 14496-10 standard (also known as H.264/AVC), another standard, or a proprietary format such as VP8 or VP9, with a corresponding decoder (270) accepting encoded data from the encoder (220). The bidirectional communication can be part of a video conference, video telephone call, or other two-party or multi-party communication scenario. Although the network environment (201) in FIG. 2a includes two real-time communication tools (210), the network environment (201) can instead include three or more real-time communication tools (210) that participate in multi-party communication.

Figure 3:
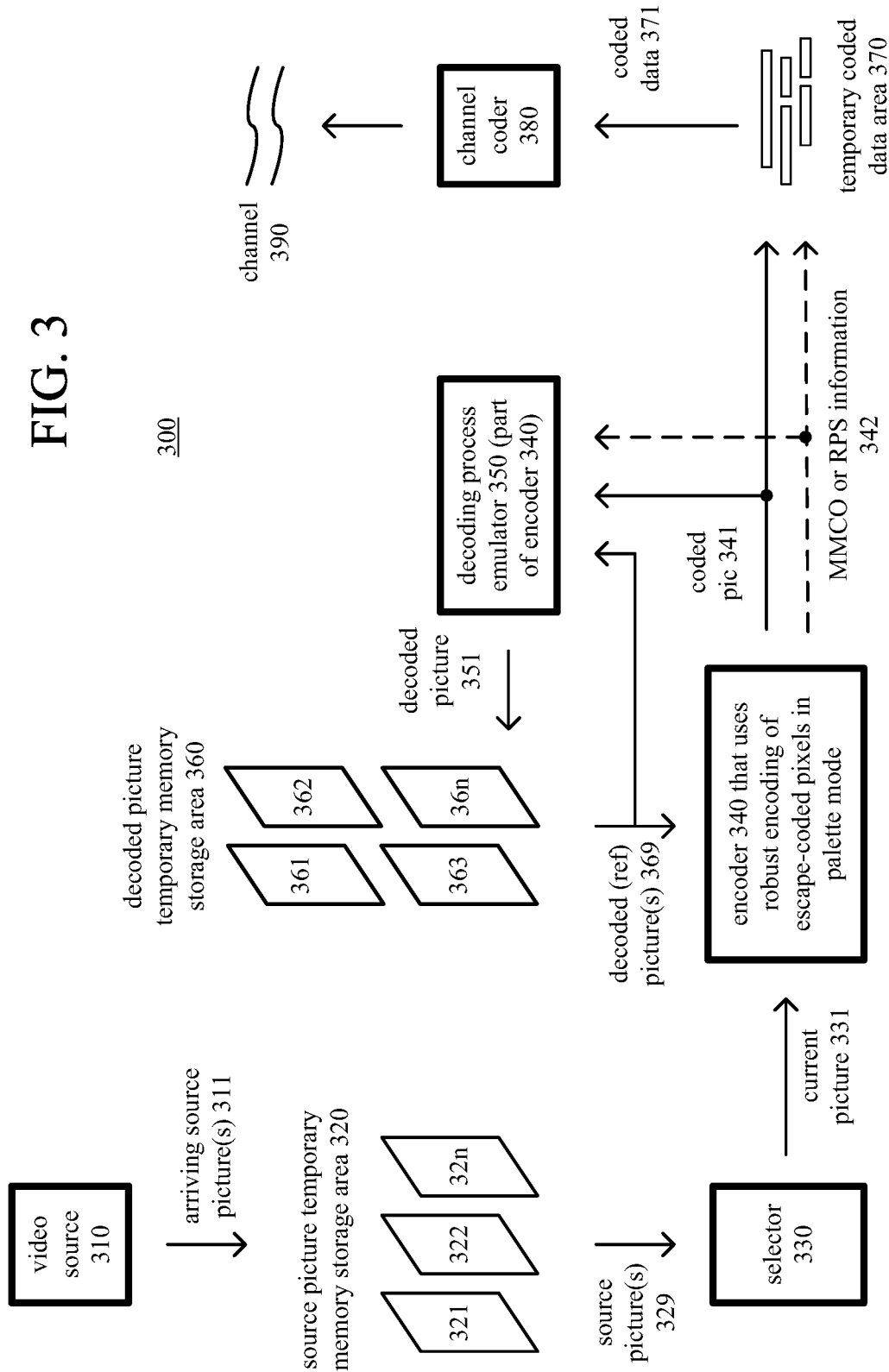
FIG. 3 is a diagram illustrating an example video encoder system in conjunction with which some described embodiments can be implemented.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270). FIG. 5 shows an example decoder system (500) that can be included in the real-time communication tool (210). Alternatively, the real-time communication tool (210) uses another decoder system.

In the network environment (202) shown in FIG. 2b, an encoding tool (212) includes an encoder (220) that encodes video for delivery to multiple playback tools (214), which include decoders (270). The unidirectional communication can be provided for a video surveillance system, web camera monitoring system, remote desktop conferencing presentation or sharing, wireless screen casting, cloud computing or gaming, or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214). A playback tool (214) can include client-side controller logic for managing connections with the encoding tool (212). FIG. 5 shows an example decoder system (500) that can be included in the playback tool (214). Alternatively, the playback tool (214) uses another decoder system.

III. Example Encoder Systems.

FIG. 3 shows an example video encoder system (300) in conjunction with which some described embodiments may be implemented. The video encoder system (300) includes a video encoder (340), which is further detailed in FIGS. 4a and 4b.

The video encoder system (300) can be a general-purpose encoding tool capable of operating in any of multiple encoding modes such as a low-latency encoding mode for real-time communication, a transcoding mode, and a higher-latency encoding mode for producing media for playback from a file or stream, or it can be a special-purpose encoding tool adapted for one such encoding mode. The video encoder system (300) can be adapted for encoding of a particular type of content. The video encoder system (300) can be implemented as part of an operating system module, as part of an application library, as part of a standalone application, or using special-purpose hardware. Overall, the video encoder system (300) receives a sequence of source video pictures (311) from a video source (310) and produces encoded data as output to a channel (390). The encoded data output to the channel can include content encoded using one or more of the innovations described herein.

The video source (310) can be a camera, tuner card, storage media, screen capture module, or other digital video source. The video source (310) produces a sequence of video pictures at a frame rate of, for example, 30 frames per second. As used herein, the term "picture" generally refers to source, coded or reconstructed image data. For progressive-scan video, a picture is a progressive-scan video frame. For interlaced video, an interlaced video frame might be de-interlaced prior to encoding. Alternatively, two complementary interlaced video fields are encoded together as a single video frame or encoded as two separately-encoded fields. Aside from indicating a progressive-scan video frame or interlaced-scan video frame, the term "picture" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source picture (311) is stored in a source picture temporary memory storage area (320) that includes multiple picture buffer storage areas (321, 322, ..., 32n). A picture buffer (321, 322, etc.) holds one source picture in the source picture storage area (320). After one or more of the source pictures (311) have been stored in picture buffers (321, 322, etc.), a picture selector (330) selects an individual source picture from the source picture storage area (320) to encode as the current picture (331). The order in which pictures are selected by the picture selector (330) for input to the video encoder (340) may differ from the order in which the pictures are produced by the video source (310), e.g., the encoding of some pictures may be delayed in order, so as to allow some later pictures to be encoded first and to thus facilitate temporally backward prediction. Before the video encoder (340), the video encoder system (300) can include a pre-processor (not shown) that performs pre-processing (e.g., filtering) of the current picture (331) before encoding. The pre-processing can include color space conversion into primary (e.g., luma) and secondary (e.g., chroma differences toward red and toward blue) components and resampling processing (e.g., to reduce the spatial resolution of chroma components) for encoding. Thus, before encoding, video may be converted to a color space such as YUV, in which sample values of a luma (Y) component represent brightness or intensity values, and sample values of chroma (U, V) components represent color-difference values. The precise definitions of the color-difference values (and conversion operations to/from YUV color space to another color space such as RGB) depend on implementation. In general, as used herein, the term YUV indicates any color space with a luma (or luminance) component and one or more chroma (or chrominance) components, including Y'UV, YIQ, Y'IQ and YDbDr as well as variations such as YCbCr and YCoCg. The chroma sample values may be sub-sampled to a lower chroma sampling rate (e.g., for a YUV 4:2:0 format or YUV 4:2:2 format), or the chroma sample values may have the same resolution as the luma sample values (e.g., for a YUV 4:4:4 format). Alternatively, video can be organized according to another format (e.g., RGB 4:4:4 format, GBR 4:4:4 format or BGR 4:4:4 format). In general, a pixel is the set of one or more collocated sample values for a location in a picture, which may be arranged in different ways for different chroma sampling formats.

Figure 4A:
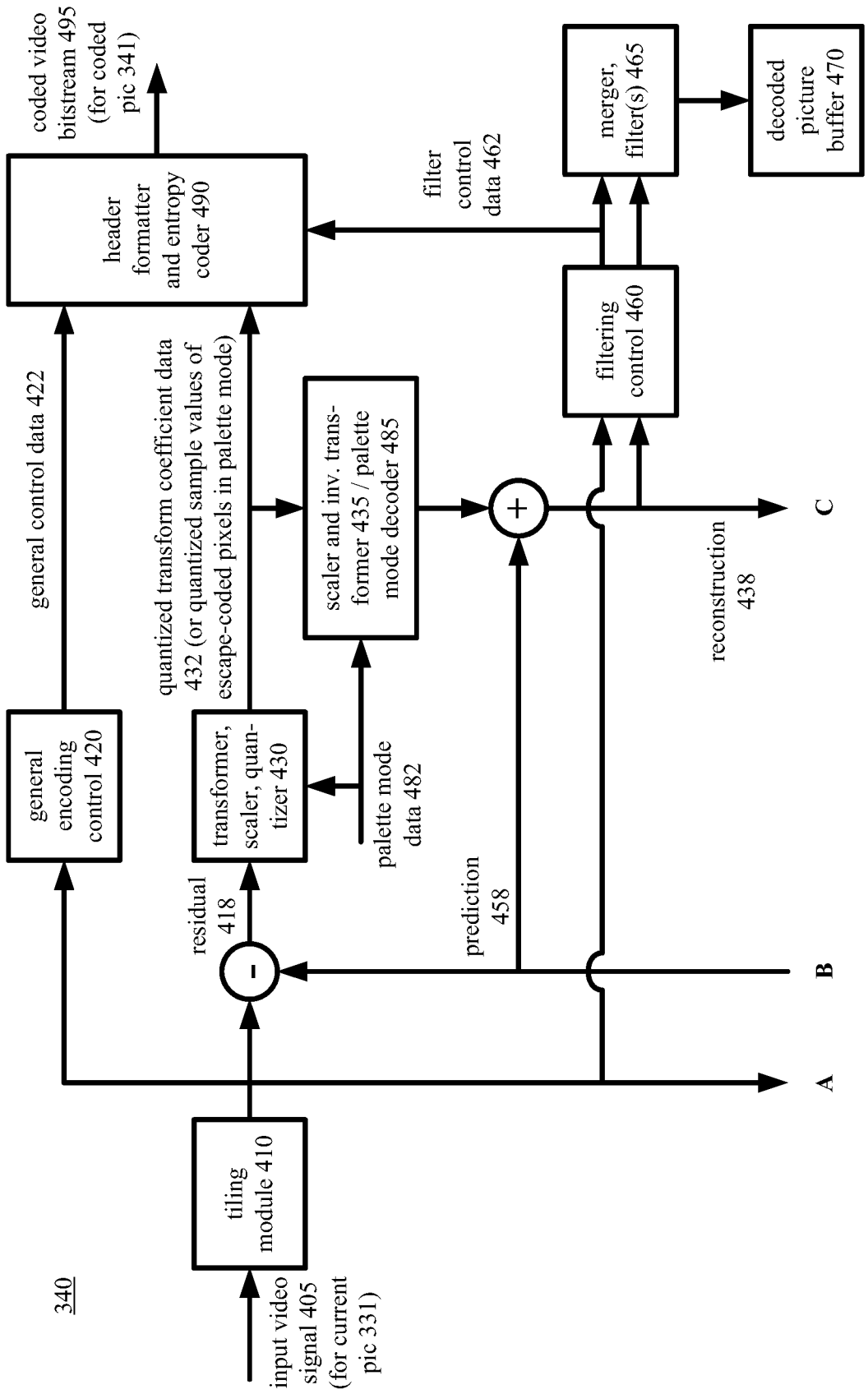
FIGS. 4a and 4b are diagrams illustrating an example video encoder in conjunction with which some described embodiments can be implemented.
Figure 4B:
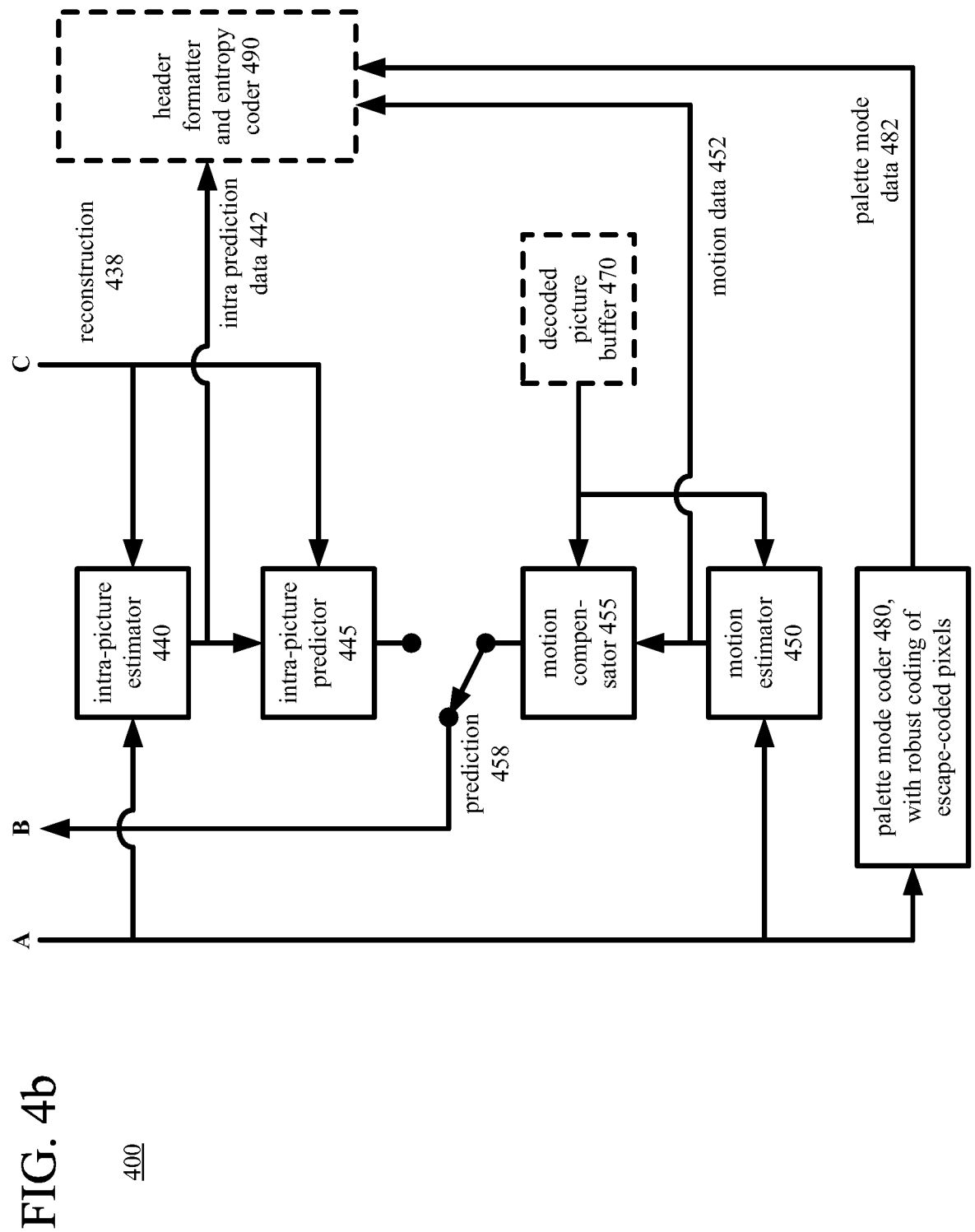

The video encoder (340) encodes the current picture (331) to produce a coded picture (341). As shown in FIGS. 4a and 4b, the video encoder (340) receives the current picture (331) as an input video signal (405) and produces encoded data for the coded picture (341) in a coded video bitstream (495) as output. As part of the encoding, the video encoder (340) in some cases uses robust encoding of escape-coded pixels in palette mode.

Generally, the video encoder (340) includes multiple encoding modules that perform encoding tasks such as partitioning into tiles, intra-picture prediction estimation and prediction, palette mode coding, motion estimation and compensation, frequency transforms, quantization, and entropy coding. Many of the components of the video encoder (340) are used for both intra-picture coding and inter-picture coding. The exact operations performed by the video encoder (340) can vary depending on compression format and can also vary depending on encoder-optional implementation decisions. The format of the output encoded data can be a variation or extension of Windows Media Video format, VC-1 format, MPEG-x format (e.g., MPEG-1, MPEG-2, or MPEG-4), H.26x format (e.g., H.261, H.262, H.263, H.264, H.265), or VPx format, or another format.

As shown in FIG. 4a, the video encoder (340) can include a tiling module (410). With the tiling module (410), the video encoder (340) can partition a picture into multiple tiles of the same size or different sizes. For example, the tiling module (410) splits the picture along tile rows and tile columns that, with picture boundaries, define horizontal and vertical boundaries of tiles within the picture, where each tile is a rectangular region. Tiles are often used to provide options for parallel processing. A picture can also be organized as one or more slices, where a slice can be an entire picture or section of the picture. A slice can be decoded independently of other slices in a picture, which improves error resilience. The content of a slice or tile is further partitioned into blocks or other sets of sample values for purposes of encoding and decoding. Blocks may be further sub-divided at different stages, e.g., at the prediction, frequency transform and/or entropy encoding stages. For example, a picture can be divided into 64×64 blocks, 32×32 blocks, or 16×16 blocks, which can in turn be divided into smaller blocks of sample values for coding and decoding.

For syntax according to the H.264/AVC standard, the video encoder (340) can partition a picture into one or more slices of the same size or different sizes. The video encoder (340) splits the content of a picture (or slice) into 16×16 macroblocks. A macroblock includes luma sample values organized as four 8×8 luma blocks and corresponding chroma sample values organized as 8×8 chroma blocks. Generally, a macroblock has a prediction mode such as inter or intra. A macroblock includes one or more prediction units (e.g., 8×8 blocks, 4×4 blocks, which may be called partitions for inter-picture prediction) for purposes of signaling of prediction information (such as prediction mode details, motion vector ("MV") information, etc.) and/or prediction processing. A macroblock also has one or more residual data units for purposes of residual coding/decoding.

For syntax according to the H.265/HEVC standard, the video encoder (340) splits the content of a picture (or slice or tile) into coding tree units. A coding tree unit ("CTU") includes luma sample values organized as a luma coding tree block ("CTB") and corresponding chroma sample values organized as two chroma CTBs. The size of a CTU (and its CTBs) is selected by the video encoder. A luma CTB can contain, for example, 64×64, 32×32, or 16×16 luma sample values. A CTU includes one or more coding units. A coding unit ("CU") has a luma coding block ("CB") and two corresponding chroma CBs. For example, according to quadtree syntax, a CTU with a 64×64 luma CTB and two 64×64 chroma CTBs (YUV 4:4:4 format) can be split into four CUs, with each CU including a 32×32 luma CB and two 32×32 chroma CBs, and with each CU possibly being split further into smaller CUs according to quadtree syntax. Or, as another example, according to quadtree syntax, a CTU with a 64×64 luma CTB and two 32×32 chroma CTBs (YUV 4:2:0 format) can be split into four CUs, with each CU including a 32×32 luma CB and two 16×16 chroma CBs, and with each CU possibly being split further into smaller CUs according to quadtree syntax.

In H.265/HEVC implementations, a CU has a prediction mode such as inter or intra. A CU typically includes one or more prediction units for purposes of signaling of prediction information (such as prediction mode details, displacement values, etc.) and/or prediction processing. A prediction unit ("PU") has a luma prediction block ("PB") and two chroma PBs. According to the H.265/HEVC standard, for an intra-picture-predicted CU, the PU has the same size as the CU, unless the CU has the smallest size (e.g., 8×8). In that case, the CU can be split into smaller PUs (e.g., four 4×4 PUs if the smallest CU size is 8×8, for intra-picture prediction) or the PU can have the smallest CU size, as indicated by a syntax element for the CU. For an inter-picture-predicted CU, the CU can have one, two, or four PUs, where splitting into four PUs is allowed only if the CU has the smallest allowable size.

In H.265/HEVC implementations, a CU also typically has one or more transform units for purposes of residual coding/decoding, where a transform unit ("TU") has a luma transform block ("TB") and two chroma TBs. A CU may contain a single TU (equal in size to the CU) or multiple TUs. According to quadtree syntax, a TU can be split into four smaller TUs, which may in turn be split into smaller TUs according to quadtree syntax. The video encoder decides how to partition video into CTUs (CTBs), CUs (CBs), PUs (PBs) and TUs (TBs).

In H.265/HEVC implementations, a slice can include a single slice segment (independent slice segment) or be divided into multiple slice segments (independent slice segment and one or more dependent slice segments). A slice segment is an integer number of CTUs ordered consecutively in a tile scan, contained in a single network abstraction layer ("NAL") unit. For an independent slice segment, a slice segment header includes values of syntax elements that apply for the independent slice segment. For a dependent slice segment, a truncated slice segment header includes a few values of syntax elements that apply for that dependent slice segment, and the values of the other syntax elements for the dependent slice segment are inferred from the values for the preceding independent slice segment in decoding order.

As used herein, the term "block" can indicate a macroblock, residual data unit, CTB, CB, PB or TB, or some other set of sample values, depending on context. The term "unit" can indicate a macroblock, CTU, CU, PU, TU or some other set of blocks, or it can indicate a single block, depending on context.

As shown in FIG. 4a, the video encoder (340) includes a general encoding control (420), which receives the input video signal (405) for the current picture (331) as well as feedback (not shown) from various modules of the video encoder (340). Overall, the general encoding control (420) provides control signals (not shown) to other modules, such as the tiling module (410), transformer/scaler/quantizer (430), scaler/inverse transformer (435), intra-picture prediction estimator (440), motion estimator (450), palette mode coder (480), and intra/inter switch, to set and change coding parameters during encoding. The general encoding control (420) can evaluate intermediate results during encoding, typically considering bit rate costs and/or distortion costs for different options. In particular, the general encoding control (420) decides whether to use intra-picture prediction or inter-picture prediction for the units of the current picture (331) and, if intra-picture prediction is used for a unit, whether to use spatial prediction (extrapolation), intra block copy prediction, or palette mode for the unit. The general encoding control (420) produces general control data (422) that indicates decisions made during encoding, so that a corresponding decoder can make consistent decisions. For example, the general control data (422) includes information indicating whether intra-picture coding for a unit uses palette coding mode or spatial prediction (e.g., a flag value per intra-picture predicted unit). The general control data (422) is provided to the header formatter/entropy coder (490).

With reference to FIG. 4b, if a unit in the current picture (331) is predicted using inter-picture prediction, a motion estimator (450) estimates the motion of blocks of sample values of the unit with respect to one or more reference pictures. The current picture (331) can be entirely or partially coded using inter-picture prediction. When multiple reference pictures are used, the multiple reference pictures can be from different temporal directions or the same temporal direction. The motion estimator (450) potentially evaluates candidate MVs in a contextual motion mode as well as other candidate MVs. For contextual motion mode, as candidate MVs for the unit, the motion estimator (450) evaluates one or more MVs that were used in motion compensation for certain neighboring units in a local neighborhood or one or more MVs derived by rules. The candidate MVs for contextual motion mode can include MVs from spatially adjacent units, MVs from temporally adjacent units, and MVs derived by rules. Merge mode in the H.265/HEVC standard is an example of contextual motion mode. In some cases, a contextual motion mode can involve a competition among multiple derived MVs and selection of one of the multiple derived MVs. The motion estimator (450) can evaluate different partition patterns for motion compensation for partitions of a given unit of the current picture (331) (e.g., 2N×2N, 2N×N, N×2N, or N×N partitions for PUs of a CU in the H.265/HEVC standard).

The decoded picture buffer (470), which is an example of decoded picture temporary memory storage area (360) as shown in FIG. 3, buffers one or more reconstructed previously coded pictures for use as reference pictures. The motion estimator (450) produces motion data (452) as side information. In particular, the motion data (452) can include information that indicates whether contextual motion mode (e.g., merge mode in the H.265/HEVC standard) is used and, if so, the candidate MV for contextual motion mode (e.g., merge mode index value in the H.265/HEVC standard). More generally, the motion data (452) can include MV data and reference picture selection data. The motion data (452) is provided to the header formatter/entropy coder (490) as well as the motion compensator (455). The motion compensator (455) applies MV(s) for a block to the reconstructed reference picture(s) from the decoded picture buffer (470). For the block, the motion compensator (455) produces a motion-compensated prediction, which is a region of sample values in the reference picture(s) that are used to generate motion-compensated prediction values for the block.

With reference to FIG. 4b, if a unit of the current picture (331) is predicted using intra-picture prediction, an intra-picture prediction estimator (440) determines how to perform intra-picture prediction for blocks of sample values of the unit. The current picture (331) can be entirely or partially coded using intra-picture prediction. Using values of a reconstruction (438) of the current picture (331), for intra spatial prediction, the intra-picture prediction estimator (440) determines how to spatially predict sample values of a block of the current picture (331) from neighboring, previously reconstructed sample values of the current picture (331), e.g., estimating extrapolation of the neighboring reconstructed sample values into the block. Or, for intra block copy mode, the intra-picture prediction estimator (440) determines how to predict sample values of a block of the current picture (331) using an offset (sometimes called a block vector) that indicates a previously encoded/decoded portion of the current picture (331). Intra block copy mode can be implemented as a special case of inter-picture prediction in which the reference picture is the current picture (331), and only previously encoded/decoded sample values of the current picture (331) can be used for prediction. As side information, the intra-picture prediction estimator (440) produces intra prediction data (442), such as the prediction mode/direction used. The intra prediction data (442) is provided to the header formatter/entropy coder (490) as well as the intra-picture predictor (445). According to the intra prediction data (442), the intra-picture predictor (445) spatially predicts sample values of a block of the current picture (331) from neighboring, previously reconstructed sample values of the current picture (331), producing intra-picture prediction values for the block. Or, the intra-picture predictor (445) predicts sample values of the block using intra block copy prediction, using an offset (block vector) for the block.

The palette mode coder (480) represents a unit of the current picture (331) with index values for base colors among the pixels of the unit, using a palette that maps the base colors to index values and replacing pixels with corresponding index values. For example, the palette maps index values 0, 1, 2, . . . , p to corresponding base colors, which can be in RGB 4:4:4 format, BGR 4:4:4 format, GBR 4:4:4 format, YUV 4:4:4 format, or another format (color space, color sampling rate). Thus, for example, an index value can represent a RGB triplet, BGR triplet or GBR triplet for a pixel. The unit can be a CU, in which case the palette can change on a CU-by-CU basis. Examples of palette mode coding are described with reference to FIGS. 7, 8a, and 8b. In some cases, the palette mode coder (480) can encode rare colors in escape mode instead of using index values for such colors in the palette. In escape mode, a special index value marks a pixel as being an escape-coded pixel. Sample value(s) of the escape-coded pixel may be quantized and subsequently entropy coded elsewhere in the encoder (340) (or, alternatively, in the palette mode coder (480)). As side information, the palette mode coder (480) produces palette mode data (482) such as information indicating the palette for a unit (which may be coded relative to a predicted palette) and index values for the unit (sometimes called an index map). The palette mode data (482) is provided to the header formatter/entropy coder (490) as well as a palette mode decoder (485).

As shown in FIG. 4b, in non-palette modes, the intra/inter switch selects whether the predictions (458) for a given unit will be motion-compensated predictions or intra-picture predictions. Intra/inter switch decisions for units of the current picture (331) can be made using various criteria.

In non-palette modes, the video encoder (340) can determine whether or not to encode and transmit the differences (if any) between a block's prediction values (intra or inter) and corresponding original values. The differences (if any) between a block of the prediction (458) and a corresponding part of the original current picture (331) of the input video signal (405) provide values of the residual (418). If encoded/transmitted, the values of the residual (418) are encoded using a frequency transform (if the frequency transform is not skipped), quantization, and entropy encoding. In some cases, no residual is calculated for a unit. Instead, residual coding is skipped, and the predicted sample values are used as the reconstructed sample values. The decision about whether to skip residual coding can be made on a unit-by-unit basis (e.g., CU-by-CU basis in the H.265/HEVC standard) for some types of units (e.g., only inter-picture-coded units) or all types of units. In palette mode, the video encoder (340) skips residual coding operations, but may quantize sample values of pixels that are encoded in escape mode.

With reference to FIG. 4a, for non-palette modes, when values of the residual (418) are encoded, in the transformer/scaler/quantizer (430), a frequency transformer converts spatial-domain video information into frequency-domain (i.e., spectral, transform) data. For block-based video coding, the frequency transformer applies a discrete cosine transform ("DCT"), an integer approximation thereof, or another type of forward block transform (e.g., a discrete sine transform or an integer approximation thereof) to blocks of values of the residual (418) (or sample value data if the prediction (458) is null), producing blocks of frequency transform coefficients. The transformer/scaler/quantizer (430) can apply a transform with variable block sizes. In this case, the transformer/scaler/quantizer (430) can determine which block sizes of transforms to use for the residual values for a current block. For example, in H.265/HEVC implementations, the transformer/scaler/quantizer (430) can split a TU by quadtree decomposition into four smaller TUs, each of which may in turn be split into four smaller TUs, down to a minimum TU size. TU size can be 32×32, 16×16, 8×8, or 4×4 (referring to the size of the luma TB in the TU).

In H.265/HEVC implementations, for non-palette modes, the frequency transform can be skipped. In this case, values of the residual (418) can be quantized and entropy coded. In particular, transform skip mode may be useful when encoding screen content video, but usually is not especially useful when encoding other types of video.

With reference to FIG. 4a, for non-palette modes, in the transformer/scaler/quantizer (430), a scaler/quantizer scales and quantizes the transform coefficients. For example, the quantizer applies dead-zone scalar quantization to the frequency-domain data with a quantization step size that varies on a picture-by-picture basis, tile-by-tile basis, slice-by-slice basis, block-by-block basis, frequency-specific basis, or other basis. The quantization step size can depend on a quantization parameter ("QP"), whose value is set for a picture, tile, slice, and/or other portion of video. When quantizing transform coefficients, the video encoder (340) can use rate-distortion-optimized quantization ("RDOQ"), which is very time-consuming, or apply simpler quantization rules. The quantized transform coefficient data (432) is provided to the header formatter/entropy coder (490). For non-palette modes, if the frequency transform is skipped, the scaler/quantizer can scale and quantize the blocks of prediction residual data (or sample value data if the prediction (458) is null), producing quantized values that are provided to the header formatter/entropy coder (490). Or, for escape-coded pixels in palette mode, the scaler/quantizer can quantize sample values of pixels in the escape mode, providing quantized sample values of escape-coded pixels to the header formatter/entropy coder (490).

As shown in FIGS. 4a and 4b, the header formatter/entropy coder (490) formats and/or entropy codes the general control data (422), quantized transform coefficient data (432) (or, for escape mode of palette mode, quantized sample values), intra prediction data (442), motion data (452), palette mode data (482), and filter control data (462). Thus, the entropy coder of the video encoder (340) compresses quantized transform coefficient values as well as certain side information (e.g., MV information, QP values, mode decisions, parameter choices, palette data, index values in palette mode, quantized sample values in palette mode). Typical entropy coding techniques include Exponential-Golomb coding, Golomb-Rice coding, context-adaptive binary arithmetic coding ("CABAC"), differential coding, Huffman coding, run length coding, variable-length-to-variable-length ("V2V") coding, variable-length-to-fixed-length ("V2F") coding, Lempel-Ziv ("LZ") coding, dictionary coding, and combinations of the above. The entropy coder can use different coding techniques for different kinds of information, can apply multiple techniques in combination (e.g., by applying Exponential-Golomb coding or Golomb-Rice coding as binarization for CABAC), and can choose from among multiple code tables within a particular coding technique.

The video encoder (340) produces encoded data for the coded picture (341) in an elementary bitstream, such as the coded video bitstream (495) shown in FIG. 4a. In FIG. 4a, the header formatter/entropy coder (490) provides the encoded data in the coded video bitstream (495). The syntax of the elementary bitstream is typically defined in a codec standard or format, or extension or variation thereof. For example, the format of the coded video bitstream (495) can be a variation or extension of Windows Media Video format, VC-1 format, MPEG-x format (e.g., MPEG-1, MPEG-2, or MPEG-4), H.26x format (e.g., H.261, H.262, H.263, H.264, H.265), VPx format, or another format. After output from the video encoder (340), the elementary bitstream is typically packetized or organized in a container format, as explained below.

The encoded data in the elementary bitstream includes syntax elements organized as syntax structures. In general, a syntax element can be any element of data, and a syntax structure is zero or more syntax elements in the elementary bitstream in a specified order. In the H.264/AVC standard and H.265/HEVC standard, a NAL unit is a syntax structure that contains (1) an indication of the type of data to follow and (2) a series of zero or more bytes of the data. For example, a NAL unit can contain encoded data for a slice (coded slice). The size of the NAL unit (in bytes) is indicated outside the NAL unit. Coded slice NAL units and certain other defined types of NAL units are termed video coding layer ("VCL") NAL units. An access unit is a set of one or more NAL units, in consecutive decoding order, containing the encoded data for the slice(s) of a picture, and possibly containing other associated data such as metadata.

For syntax according to the H.264/AVC standard or H.265/HEVC standard, a picture parameter set ("PPS") is a syntax structure that contains syntax elements that may be associated with a picture. A PPS can be used for a single picture, or a PPS can be reused for multiple pictures in a sequence. A PPS is typically signaled separate from encoded data for a picture (e.g., one NAL unit for a PPS, and one or more other NAL units for encoded data for a picture). Within the encoded data for a picture, a syntax element indicates which PPS to use for the picture. Similarly, for syntax according to the H.264/AVC standard or H.265/HEVC standard, a sequence parameter set ("SPS") is a syntax structure that contains syntax elements that may be associated with a sequence of pictures. A bitstream can include a single SPS or multiple SPSs. An SPS is typically signaled separate from other data for the sequence, and a syntax element in the other data indicates which SPS to use.

As shown in FIG. 3, the video encoder (340) also produces memory management control operation ("MMCO") signals (342) or reference picture set ("RPS") information. The RPS is the set of pictures that may be used for reference in motion compensation for a current picture or any subsequent picture. If the current picture (331) is not the first picture that has been encoded, when performing its encoding process, the video encoder (340) may use one or more previously encoded/decoded pictures (369) that have been stored in a decoded picture temporary memory storage area (360). Such stored decoded pictures (369) are used as reference pictures for inter-picture prediction of the content of the current picture (331). The MMCO/RPS information (342) indicates to a video decoder which reconstructed pictures may be used as reference pictures, and hence should be stored in a picture storage area.

With reference to FIG. 3, the coded picture (341) and MMCO/RPS information (342) (or information equivalent to the MMCO/RPS information (342), since the dependencies and ordering structures for pictures are already known at the video encoder (340)) are processed by a decoding process emulator (350). The decoding process emulator (350) implements some of the functionality of a video decoder, for example, decoding tasks to reconstruct reference pictures. In a manner consistent with the MMCO/RPS information (342), the decoding process emulator (350) determines whether a given coded picture (341) needs to be reconstructed and stored for use as a reference picture in inter-picture prediction of subsequent pictures to be encoded. If a coded picture (341) needs to be stored, the decoding process emulator (350) models the decoding process that would be conducted by a video decoder that receives the coded picture (341) and produces a corresponding decoded picture (351). In doing so, when the video encoder (340) has used decoded picture(s) (369) that have been stored in the decoded picture storage area (360), the decoding process emulator (350) also uses the decoded picture(s) (369) from the storage area (360) as part of the decoding process.

The decoding process emulator (350) may be implemented as part of the video encoder (340). For example, the decoding process emulator (350) includes some of the modules and logic shown in FIGS. 4a and 4b. During reconstruction of the current picture (331), for non-palette modes, when values of the residual (418) have been encoded/signaled, reconstructed residual values are combined with the prediction (458) to produce an approximate or exact reconstruction (438) of the original content from the video signal (405) for the current picture (331). (In lossy compression, some information is lost from the video signal (405).) For palette mode, the prediction (458) is effectively null.

For non-palette modes, to reconstruct residual values, in the scaler/inverse transformer (435), a scaler/inverse quantizer performs inverse scaling and inverse quantization on the quantized transform coefficients. When the transform stage has not been skipped, an inverse frequency transformer performs an inverse frequency transform, producing blocks of reconstructed prediction residual values or sample values. If the transform stage has been skipped, the inverse frequency transform is also skipped. In this case, the scaler/inverse quantizer can perform inverse scaling and inverse quantization on blocks of prediction residual data (or sample value data), producing reconstructed values. When residual values have been encoded/signaled, the video encoder (340) combines reconstructed residual values with values of the prediction (458) (e.g., motion-compensated prediction values, intra-picture prediction values) to form the reconstruction (438). When residual values have not been encoded/signaled, the video encoder (340) uses the values of the prediction (458) as the reconstruction (438).

For palette mode, the palette mode decoder (485) uses index values and a palette from the palette mode data (482) to reconstruct pixels (that is, non-escape-coded pixels). To reconstruct any escape-coded pixels, in the scaler/inverse transformer (435), a scaler/inverse quantizer performs inverse scaling and inverse quantization on quantized sample values for the pixels encoded in escape mode. The reconstructed sample values provide values of the reconstruction (438), since the prediction (458) is null in palette mode.

For intra-picture prediction, the values of the reconstruction (438) can be fed back to the intra-picture prediction estimator (440) and intra-picture predictor (445). The values of the reconstruction (438) can be used for motion-compensated prediction of subsequent pictures. The values of the reconstruction (438) can be further filtered. A filtering control (460) determines how to perform deblock filtering and sample adaptive offset ("SAO") filtering on values of the reconstruction (438), for the current picture (331). The filtering control (460) produces filter control data (462), which is provided to the header formatter/entropy coder (490) and merger/filter(s) (465).

In the merger/filter(s) (465), the video encoder (340) merges content from different tiles into a reconstructed version of the current picture. The video encoder (340) selectively performs deblock filtering and SAO filtering according to the filter control data (462) and rules for filter adaptation, so as to adaptively smooth discontinuities across boundaries in the current picture (331). Other filtering (such as de-ringing filtering or adaptive loop filtering ("ALF"); not shown) can alternatively or additionally be applied. Tile boundaries can be selectively filtered or not filtered at all, depending on settings of the video encoder (340), and the video encoder (340) may provide syntax elements within the coded bitstream to indicate whether or not such filtering was applied.

In FIGS. 4a and 4b, the decoded picture buffer (470) buffers the reconstructed current picture for use in subsequent motion-compensated prediction. More generally, as shown in FIG. 3, the decoded picture temporary memory storage area (360) includes multiple picture buffer storage areas (361, 362, . . . , 36*n*). In a manner consistent with the MMCO/RPS information (342), the decoding process emulator (350) manages the contents of the storage area (360) in order to identify any picture buffers (361, 362, etc.) with pictures that are no longer needed by the video encoder (340) for use as reference pictures. After modeling the decoding process, the decoding process emulator (350) stores a newly decoded picture (351) in a picture buffer (361, 362, etc.) that has been identified in this manner.

As shown in FIG. 3, the coded picture (341) and MMCO/RPS information (342) are buffered in a temporary coded data area (370). The coded data that is aggregated in the coded data area (370) contains, as part of the syntax of the elementary bitstream, encoded data for one or more pictures. The coded data that is aggregated in the coded data area (370) can also include media metadata relating to the coded video data (e.g., as one or more parameters in one or more supplemental enhancement information ("SEI") messages or video usability information ("VUI") messages).

The aggregated data (371) from the temporary coded data area (370) is processed by a channel encoder (380). The channel encoder (380) can packetize and/or multiplex the aggregated data for transmission or storage as a media stream (e.g., according to a media program stream or transport stream format such as ITU-T H.222.0 ISO/IEC 13818-1 or an Internet real-time transport protocol format such as IETF RFC 3550), in which case the channel encoder (380) can add syntax elements as part of the syntax of the media transmission stream. Or, the channel encoder (380) can organize the aggregated data for storage as a file (e.g., according to a media container format such as ISO/IEC 14496-12), in which case the channel encoder (380) can add syntax elements as part of the syntax of the media storage file. Or, more generally, the channel encoder (380) can implement one or more media system multiplexing protocols or transport protocols, in which case the channel encoder (380) can add syntax elements as part of the syntax of the protocol(s). The channel encoder (380) provides output to a channel (390), which represents storage, a communications connection, or another channel for the output. The channel encoder (380) or channel (390) may also include other elements (not shown), e.g., for forward-error correction ("FEC") encoding and analog signal modulation.

Depending on implementation and the type of compression desired, modules of the video encoder system (300) and/or video encoder (340) can be added, omitted, split into multiple modules, combined with other modules, and/or replaced with like modules. In alternative embodiments, encoder systems or encoders with different modules and/or other configurations of modules perform one or more of the described techniques. Specific embodiments of encoder systems typically use a variation or supplemented version of the video encoder system (300). Specific embodiments of video encoders typically use a variation or supplemented version of the video encoder (340). The relationships shown between modules within the video encoder system (300) and video encoder (340) indicate general flows of information in the video encoder system (300) and video encoder (340), respectively; other relationships are not shown for the sake of simplicity.

IV. Example Decoder Systems.

FIG. 5 is a block diagram of an example video decoder system (500) in conjunction with which some described embodiments may be implemented. The video decoder system (500) includes a video decoder (550), which is further detailed in FIG. 6.

The video decoder system (500) can be a general-purpose decoding tool capable of operating in any of multiple decoding modes such as a low-latency decoding mode for real-time communication, a transcoding mode, and a higher-latency decoding mode for media playback from a file or stream, or it can be a special-purpose decoding tool adapted for one such decoding mode. The video decoder system (500) can be implemented as part of an operating system module, as part of an application library, as part of a standalone application or using special-purpose hardware. Overall, the video decoder system (500) receives coded data from a channel (510) and produces reconstructed pictures as output for an output destination (590). The received encoded data can include content encoded using one or more of the innovations described herein.

The decoder system (500) includes a channel (510), which can represent storage, a communications connection, or another channel for coded data as input. The channel (510) produces coded data that has been channel coded. A channel decoder (520) can process the coded data. For example, the channel decoder (520) de-packetizes and/or demultiplexes data that has been organized for transmission or storage as a media stream (e.g., according to a media program stream or transport stream format such as ITU-T H.222.0 ISO/IEC 13818-1 or an Internet real-time transport protocol format such as IETF RFC 3550), in which case the channel decoder (520) can parse syntax elements added as part of the syntax of the media transmission stream. Or, the channel decoder (520) separates coded video data that has been organized for storage as a file (e.g., according to a media container format such as ISO/IEC 14496-12), in which case the channel decoder (520) can parse syntax elements added as part of the syntax of the media storage file. Or, more generally, the channel decoder (520) can implement one or more media system demultiplexing protocols or transport protocols, in which case the channel decoder (520) can parse syntax elements added as part of the syntax of the protocol(s). The channel (510) or channel decoder (520) may also include other elements (not shown), e.g., for FEC decoding and analog signal demodulation.

The coded data (521) that is output from the channel decoder (520) is stored in a temporary coded data area (530) until a sufficient quantity of such data has been received. The coded data (521) includes coded pictures (531) and MMCO/RPS information (532). The coded data (521) in the coded data area (530) contain, as part of the syntax of an elementary coded video bitstream, coded data for one or more pictures. The coded data (521) in the coded data area (530) can also include media metadata relating to the encoded video data (e.g., as one or more parameters in one or more SEI messages or VUI messages).

In general, the coded data area (530) temporarily stores coded data (521) until such coded data (521) is used by the video decoder (550). At that point, coded data for a coded picture (531) and MMCO/RPS information (532) are transferred from the coded data area (530) to the video decoder (550). As decoding continues, new coded data is added to the coded data area (530) and the oldest coded data remaining in the coded data area (530) is transferred to the video decoder (550).

Figure 6:
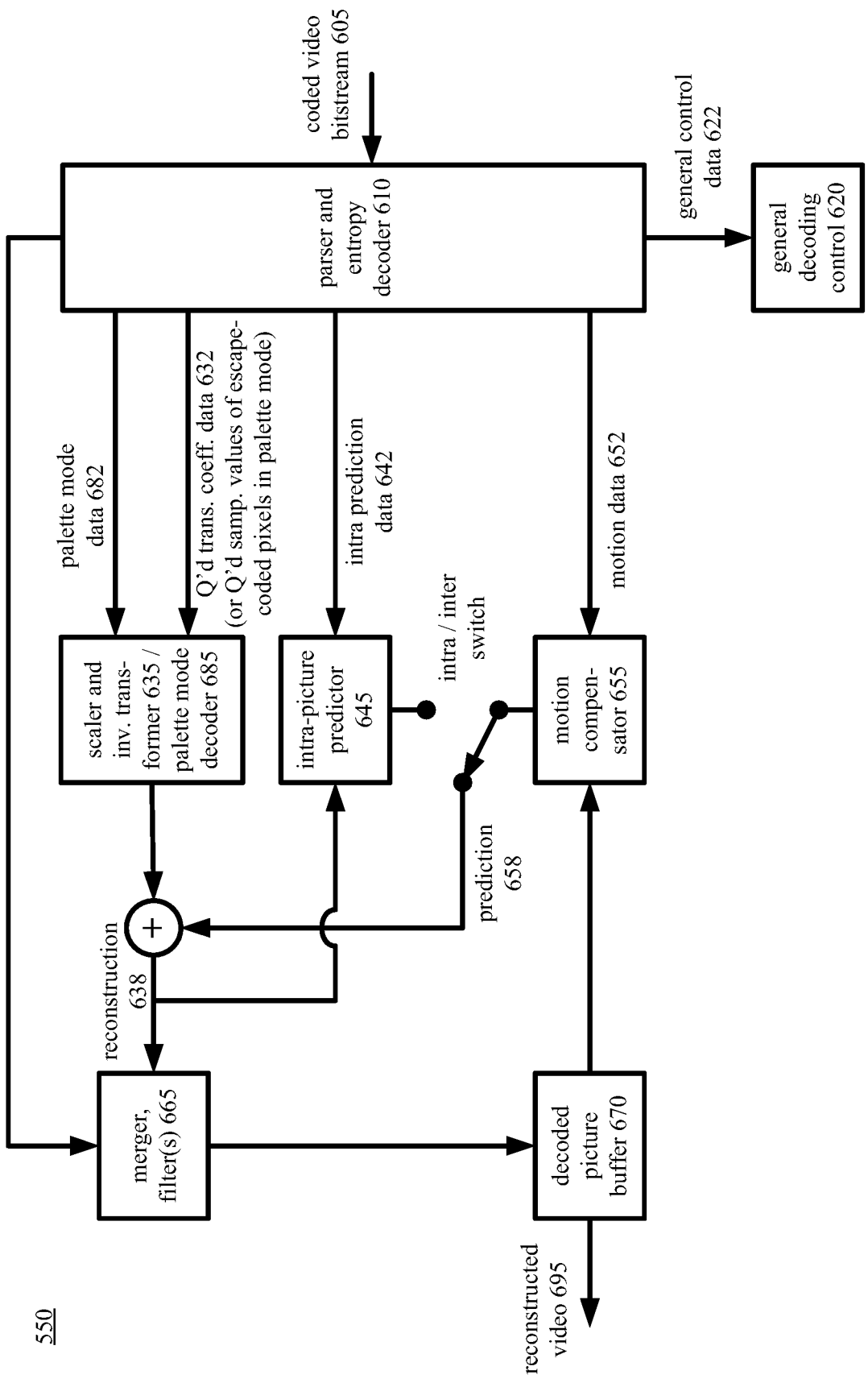
FIG. 6 is a diagram illustrating an example video decoder in conjunction with which some described embodiments can be implemented.

The video decoder (550) decodes a coded picture (531) to produce a corresponding decoded picture (551). As shown in FIG. 6, the video decoder (550) receives the coded picture (531) as input as part of a coded video bitstream (605), and the video decoder (550) produces the corresponding decoded picture (551) as output as reconstructed video (695). As part of the decoding, the video decoder (550) in some cases uses robust decoding of escape-coded pixels in palette mode.

Generally, the video decoder (550) includes multiple decoding modules that perform decoding tasks such as entropy decoding, inverse quantization, inverse frequency transforms, motion compensation, intra-picture prediction, palette mode decoding, and filtering. Many of the components of the decoder (550) are used for both intra-picture decoding and inter-picture decoding. The exact operations performed by those components can vary depending on the type of information being decompressed. The format of the coded video bitstream (605) can be a variation or extension of Windows Media Video format, VC-1 format, MPEG-x format (e.g., MPEG-1, MPEG-2, or MPEG-4), H.26x format (e.g., H.261, H.262, H.263, H.264, H.265), or VPx format, or another format.

A picture can be organized into multiple tiles of the same size or different sizes. A picture can also be organized as one or more slices. The content of a slice or tile can be further organized as blocks or other sets of sample values. Blocks may be further sub-divided at different stages. For example, a picture can be divided into 64×64 blocks, 32×32 blocks or 16×16 blocks, which can in turn be divided into smaller blocks of sample values. In implementations of decoding for the H.264/AVC standard, for example, a picture is divided into macroblocks and blocks. In implementations of decoding for the H.265/HEVC standard, for example, a picture is partitioned into CTUs (CTBs), CUs (CBs), PUs (PBs) and TUs (TBs).

With reference to FIG. 6, a buffer receives encoded data in the coded video bitstream (605) and makes the received encoded data available to the parser/entropy decoder (610). The parser/entropy decoder (610) entropy decodes entropy-coded data, typically applying the inverse of entropy coding performed in the encoder (340) (e.g., context-adaptive binary arithmetic decoding with binarization using Exponential-Golomb or Golomb-Rice). As a result of parsing and entropy decoding, the parser/entropy decoder (610) produces general control data (622), quantized transform coefficient data (632) (or, for escape mode of palette mode, quantized sample values), intra prediction data (642), motion data (652), palette mode data (682), and filter control data (662). The palette mode data (682) for a unit includes information indicating the palette for the unit (which may be coded relative to a predicted palette) and index values for the unit (index map).

The general decoding control (620) receives the general control data (622). For example, the general control data (622) includes information indicating whether intra-picture coding for a unit uses palette coding mode or spatial prediction (e.g., a flag value per intra-picture predicted unit). The general decoding control (620) provides control signals (not shown) to other modules (such as the scaler/inverse transformer (635), intra-picture predictor (645), motion compensator (655), palette mode decoder (685), and intra/inter switch) to set and change decoding parameters during decoding.

With reference to FIG. 5, as appropriate, when performing its decoding process, the video decoder (550) may use one or more previously decoded pictures (569) as reference pictures for inter-picture prediction. The video decoder (550) reads such previously decoded pictures (569) from a decoded picture temporary memory storage area (560), which is an example of decoded picture buffer (670). With reference to FIG. 6, if the current picture is predicted using inter-picture prediction, a motion compensator (655) receives the motion data (652), such as MV data, reference picture selection data and merge mode index values. The motion compensator (655) applies MVs to the reconstructed reference picture(s) from the decoded picture buffer (670). The motion compensator (655) produces motion-compensated predictions for inter-coded blocks of the current picture.

In a separate path within the video decoder (550), the intra-picture predictor (645) receives the intra prediction data (642), such as information indicating the prediction mode/direction used. For intra spatial prediction, using values of a reconstruction (638) of the current picture, according to the prediction mode/direction, the intra-picture predictor (645) spatially predicts sample values of a current block of the current picture from neighboring, previously reconstructed sample values of the current picture. Or, for intra block copy mode, the intra-picture predictor (645) predicts the sample values of a current block using previously reconstructed sample values of a reference block, which is indicated by an offset (block vector) for the current block.

For a palette decoding mode, the palette mode decoder (685) receives palette mode data (682), such as information representing a palette and index values. The palette mode decoder (685) uses a palette that represents at least some of the pixels of a unit (e.g., CU). The palette maps index values to corresponding base colors used in the unit. During decoding, for pixels in the unit, index values from the palette are replaced with the appropriate base colors for the pixels. An escape-coded pixel in the unit can be decoded using an escape code (special index value in the palette) and quantized sample value(s) for the escape-coded pixel, which are reconstructed as described below. The palette can change from unit to unit, based on palette mode data (682) signaled in the bitstream.

For non-palette modes, the intra/inter switch selects values of a motion-compensated prediction or intra-picture prediction for use as the prediction (658) for a given block. For example, when H.265/HEVC syntax is followed, the intra/inter switch can be controlled based on a syntax element encoded for a CU of a picture that can contain intra-predicted CUs and inter-predicted CUs. When residual values have been encoded/signaled, the video decoder (550) combines the prediction (658) with reconstructed residual values to produce the reconstruction (638) of the content from the video signal. When residual values have not been encoded/signaled, the video decoder (550) uses the values of the prediction (658) as the reconstruction (638). In palette mode, the video decoder (550) skips residual decoding operations, but may inverse quantize sample values of pixels that have been encoded in escape mode.

For non-palette modes, the video decoder (550) also reconstructs prediction residual values. To reconstruct the residual when residual values have been encoded/signaled, the scaler/inverse transformer (635) receives and processes the quantized transform coefficient data (632). In the scaler/inverse transformer (635), a scaler/inverse quantizer performs inverse scaling and inverse quantization on the quantized transform coefficients. The scaler/inverse transformer (635) sets values for QP for a picture, tile, slice and/or other portion of video based on syntax elements in the bitstream. An inverse frequency transformer performs an inverse frequency transform, producing blocks of reconstructed prediction residual values or sample values. For example, the inverse frequency transformer applies an inverse block transform to frequency transform coefficients, producing sample value data or prediction residual data. The inverse frequency transform can be an inverse DCT, an integer approximation thereof, or another type of inverse frequency transform (e.g., an inverse discrete sine transform or an integer approximation thereof). If the frequency transform was skipped during encoding, the inverse frequency transform is also skipped. In this case, the scaler/inverse quantizer can perform inverse scaling and inverse quantization on blocks of prediction residual data (or sample value data), producing reconstructed values. The video decoder (550) combines reconstructed prediction residual values with prediction values of the prediction (658), producing values of the reconstruction (638).

For palette mode, to reconstruct any escape-coded pixels, in the scaler/inverse transformer (635), a scaler/inverse quantizer performs inverse scaling and inverse quantization on any quantized sample values of pixels encoded in escape mode. The reconstructed sample values provide values of the reconstruction (638), since the prediction (658) is null in palette mode.

For intra-picture prediction, the values of the reconstruction (638) can be fed back to the intra-picture predictor (645). For inter-picture prediction, the values of the reconstruction (638) can be further filtered. In the merger/filter(s) (665), the video decoder (550) merges content from different tiles into a reconstructed version of the picture. The video decoder (550) selectively performs deblock filtering and SAO filtering according to the filter control data (662) and rules for filter adaptation, so as to adaptively smooth discontinuities across boundaries in the pictures. Other filtering (such as de-ringing filtering or ALF; not shown) can alternatively or additionally be applied. Tile boundaries can be selectively filtered or not filtered at all, depending on settings of the video decoder (550) or a syntax element within the encoded bitstream data. The decoded picture buffer (670) buffers the reconstructed current picture for use in subsequent motion-compensated prediction.

The video decoder (550) can also include a post-processing filter. The post-processing filter can include deblock filtering, de-ringing filtering, adaptive Wiener filtering, film-grain reproduction filtering, SAO filtering or another kind of filtering. Whereas "in-loop" filtering is performed on reconstructed sample values of pictures in a motion compensation loop, and hence affects sample values of reference pictures, the post-processing filter is applied to reconstructed sample values outside of the motion compensation loop, before output for display.

With reference to FIG. 5, the decoded picture temporary memory storage area (560) includes multiple picture buffer storage areas (561, 562, . . . , 56n). The decoded picture storage area (560) is an example of a decoded picture buffer (670). The decoder (550) uses the MMCO/RPS information (532) to identify a picture buffer (561, 562, etc.) in which it can store a decoded picture (551). The decoder (550) stores the decoded picture (551) in that picture buffer.

An output sequencer (580) identifies when the next picture to be produced in output order is available in the decoded picture storage area (560). When the next picture (581) to be produced in output order is available in the decoded picture storage area (560), it is read by the output sequencer (580) and output to the output destination (590) (e.g., display). In general, the order in which pictures are output from the decoded picture storage area (560) by the output sequencer (580) may differ from the order in which the pictures are decoded by the decoder (550).

Depending on implementation and the type of decompression desired, modules of the video decoder system (500) and/or video decoder (550) can be added, omitted, split into multiple modules, combined with other modules, and/or replaced with like modules. In alternative embodiments, decoder systems or decoders with different modules and/or other configurations of modules perform one or more of the described techniques. Specific embodiments of decoder systems typically use a variation or supplemented version of the video decoder system (500). Specific embodiments of video decoders typically use a variation or supplemented version of the video decoder (550). The relationships shown between modules within the video decoder system (500) and video decoder (550) indicate general flows of information in the video decoder system (500) and video decoder (550), respectively; other relationships are not shown for the sake of simplicity.

V. Robust Encoding/Decoding of Escape-coded Pixels in Palette Mode.

This section presents approaches to robust encoding and decoding of escape-coded pixels in a palette mode. In example implementations, these approaches avoid dependencies on unit-level QP values when parsing the escape-coded pixels, which can make encoding/decoding more robust to data loss.

A. Introduction to Palette Mode.

In palette mode, a media encoder (such as a video encoder or image encoder) encodes pixels using index values that represent base colors. Typically, each of the index values is associated with a different value ("base color") among the pixels. During encoding, the pixels are replaced with corresponding index values. The media encoder encodes and signals a palette that maps index values to corresponding base colors, as well as the arrangement of index values that represent the pixels ("index map"). A media decoder (such as a video decoder or image decoder) receives and decodes the palette that maps index values to corresponding base colors. Using that palette, the media decoder replaces index values of the index map with corresponding base colors for the pixels.

Figure 7:
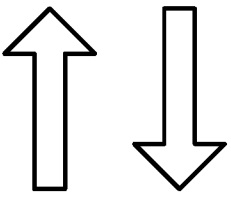
FIG. 7 is a diagram illustrating an example of coding and decoding in palette mode.

FIG. 7 shows blocks of sample values for a unit (710). The unit (730) is a 4×4 unit. More generally, the unit (710) can have a size i×j for a two-dimensional arrangement, for $i_{min} \le i \le i_{max}$ and $j_{min} \le j \le j_{max}$, where i and j can have an equal value or have different values. The values of $i_{min}$, $i_{max}$, $j_{min}$, and $j_{max}$ depend on implementation. For example, for some implementations of H.265/HEVC encoding/decoding, $i_{min}=j_{min}=8$, and $i_{max}=j_{max}=$the maximum allowed transform size. Thus, the unit can have a size other than 4×4 (e.g., 8×8, 16×16, or 32×32). Or, the media encoder can create a palette for the pixels of a slice, a tile, an entire picture, a group of pictures, or a video sequence.

In FIG. 7, the sample values represent intensity or brightness values for screen capture content, and the sample values include sections of uniform values and strong patterns. The unit (710) has three blocks of sample values for different color components (e.g., R, G, and B components, or Y, U, and V components). Alternatively, the unit (710) can be monochrome, having a single block of sample values. In FIG. 7, the unit (710) includes four distinct colors: (200, 120, 93), (168, 101, 28), (127, 127, 127), and (41, 41, 41).

The media encoder creates a palette (720) that assigns index values to corresponding base colors. In the example of FIG. 7, the index value 0 is assigned to the color (200, 120, 93), the index value 1 is assigned to the color (168, 101, 28), and so on. The media encoder can assign index values to base colors according to their likelihood of occurrence in the unit, such that more common colors have lower index values and less common colors have higher index values, which tends to result in more efficient coding if lower index values are represented with fewer bits. Alternatively, the media encoder can assign index values to base colors according to order of appearance as a unit is scanned, relying on later processes such as prediction to exploit redundancy among the index values of the index map. The palette (720) can be implemented as a look-up table or other data structure.

FIG. 7 shows an index map (730) in which pixels have been replaced with corresponding index values. The process of replacing pixels with index values is lossless. (Alternatively, in a lossy compression variation, if an exact match is not available, a pixel can be replaced with the index value representing the base color closest to the pixel. This can reduce the size of the palette (720) but also introduce perceptible distortion.) Escape coding is another approach to handling pixels not represented with index values.

The media encoder encodes and outputs the palette (720) as well as the index map (730) with index values representing pixels of the unit (710). As part of the encoding, the index values of the index map (730) can be processed with further mapping operations, prediction, and/or entropy coding. The palette (720) can also be further processed with prediction and/or entropy coding.

During decoding, a media decoder receives and decodes the palette (720) and data for the index map (730). As part of the decoding, the index values for the index map (730) can be processed with entropy decoding, mapping operations, and/or prediction. Also, the palette (720) can be processed with entropy decoding and/or prediction. For palette mode decoding, the media decoder then reverses the mapping process using the palette (720), as illustrated in FIG. 7.

In some cases, a unit includes a rare color. For example, the rare color may appear only one or two times among the hundreds of pixels of a 16×16 unit or 32×32 unit. Although rare colors can be represented in a palette, the cost of signaling palette data for the rare colors may outweigh the benefits. Instead of representing rare colors in a palette, a media encoder can encode a pixel having a rare color in escape mode. For escape mode, the palette includes a special index value that marks a pixel as being encoded in escape mode. Then, sample values for the escape-coded pixel may be quantized and entropy coded. A media encoder need not encode rare colors in escape mode (that is, the media encoder could represent all colors of a unit in a palette), but using escape mode can improve coding efficiency in some cases. The threshold for whether a color qualifies as a rare color depends on implementation (e.g., less than x occurrences in a unit, where x is 1, 2, 3, or some other threshold; or, less than y % of the pixels in a unit, where y is 0.5, 1.0, 2.0, or some other threshold).

Figure 8A:
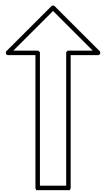
FIGS. 8a and 8b are diagrams illustrating examples of encoding and decoding, respectively, of sample values in escape mode of palette mode.
Figure 8B:
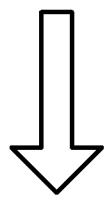

FIG. 8a shows an example of encoding of sample values in escape mode of palette mode. FIG. 8b shows an example of corresponding decoding of sample values in escape mode of palette mode. In general, the options described above for the example of FIG. 7 also apply for the example of FIGS. 8a and 8b (e.g., size of unit, number of blocks of sample values, organization of palette, ordering of index values in palette, encoding/decoding of palette and index map, lossy variations of mapping).

FIG. 8a shows blocks of original sample values for a unit (810). In FIG. 8a, the unit (810) includes six distinct colors: (200, 120, 93), (168, 101, 28), (127, 127, 127), (41, 41, 41), (100, 80, 120), and (155, 91, 200).

The media encoder creates a palette (820) that assigns index values to four of the base colors, which are the four most common colors. In the example of FIG. 8a, the index value 0 is assigned to the color (200, 120, 93), the index value 1 is assigned to the color (168, 101, 28), and so on. Two colors—(100, 80, 120), and (155, 91, 200)—are not represented with index values. Instead, any pixel with one of these two rare colors is escape coded. The palette (820) includes a special index value used to mark an escape-coded pixel. In example implementations, the special index value is the last index value in the palette (820), which may improve overall coding efficiency since other index values are supposed to be more common. In FIGS. 8a and 8b, the special index value is index value 4.

FIG. 8a shows an index map (830) in which pixels have been replaced with corresponding index values. Two pixels have been replaced with the special index value, marking those two pixels as escape-coded pixels. The media encoder also produces a list (840) of quantized sample values for the escape-coded pixels. The QP used for quantization can be, for example, a slice-level QP, as described below. In FIG. 8a, the sample values for the pixels (100, 80, 120), and (155, 91, 200) are quantized using a quantization step size of 12, where the quantization step size depends on the QP. The quantized sample values are 8 (from 100), 7 (from 80), 10 (from 120), 13 (from 155), 8 (from 91), and 17 (from 200). The media encoder also entropy codes the quantized sample values, e.g., using CABAC.

FIG. 8b shows reconstructed blocks of sample values for the unit (810), as well as the palette (820), index map (830), and list (840) of quantized sample values from FIG. 8a. Most pixels are reconstructed by reverse mapping using the palette (820). Sample values for the escape-coded pixels, however, are reconstructed using entropy decoding and inverse quantization. For the escape-coded pixels, the reconstructed sample values may exactly or approximately match the original sample values. As shown in FIG. 8b, quantization may introduce loss for some sample values of escape-coded pixels.

In some implementations of escape mode of palette mode for H.265/HEVC encoding and decoding, the QP used when quantizing sample values of escape-coded pixels is the QP for the coding unit ("CU") that includes the escape-coded pixels. The QP value can change on a CU-by-CU basis using CU-level QP offset values. The CU-level QP affects entropy coding and decoding. In particular, during encoding, when a quantized sample value is converted to a string of binary values before context-adaptive binary arithmetic coding, the number of binary values in the string depends on the maximum value possible for the quantized sample value. Similarly, during decoding, the set of strings of binary values used in conjunction with context-adaptive binary arithmetic decoding of the quantized sample value depends on the maximum value possible for the quantized sample value. The maximum value, in turn, depends on the sample depth for the sample value and the QP used for quantization (here, the CU-level QP). From the maximum value possible for the quantized sample value, the encoder and decoder determine the number of binary values used to represent the quantized sample value for the escape-coded pixel.

Thus, during decoding, the correct parsing of an entropy-coded, quantized sample value for an escape-coded pixel depends on the decoder first reconstructing the CU-level QP for a CU. The decoder uses the CU-level QP when determining the set of strings of binary values possible for the quantized sample value, and hence when determining how many binary values to read from the bitstream. This parsing dependency between decoding of quantized sample values of escape-coded pixels and CU-level QP values can be problematic. In particular, the parsing dependency can lead to severe quality degradation when there are transmission errors.

In contrast, in some implementations of H.265/HEVC encoding/decoding, a parsing dependency does not exist between decoding of quantized transform coefficients and CU-level QP values. Even when QP value can change on a CU-by-CU basis or change from block-to-block for a CU, quantized transform coefficient coding/decoding is independent of the QP values. When parsing/entropy decoding quantized transform coefficients from a bitstream, there is no need to reconstruct the CU-level QP values. So, there is no parsing dependency on the CU-level QP values.

B. Generalized Techniques for Robust Coding/Decoding of Escape-coded Pixels in Palette Mode.

FIG. 9 shows a generalized technique (900) for encoding that includes robust coding of pixels in escape mode of palette mode. A media encoder such as a video encoder as described with reference to FIGS. 3, 4a, and 4b, or other media encoder, performs the technique (900).

The media encoder receives (910) a current picture. The media encoder then encodes the current picture on a unit-by-unit basis. The units of the current picture can be CUs, macroblocks, or some other type of units. As part of the encoding the current picture, the media encoder encodes (920) a current unit of the current picture. The media encoder checks (930) whether to continue with a next unit of the current picture and, if so, continues by encoding the next unit (as the current unit). After encoding all of the units of the current picture, the media encoder checks (940) whether to continue with a next picture, e.g., the next picture in a video sequence. If so, the media encoder continues by receiving the next picture (as the current picture).

During the encoding process, for at least one unit, the encoder encodes the unit in palette mode and, as part of the palette mode coding, encodes a sample value of the unit in an escape mode of the palette mode independent of any unit-level QP for the unit. Various example approaches to encoding sample values in escape mode of palette mode are detailed in the next four sections with reference to FIGS. 11-18. Other units of the current picture can be encoded in a palette mode with no escape-coded pixels and/or encoded in a non-palette mode.

The media encoder can selectively enable/disable whether sample values of escape-coded pixels are encoded independent of any unit-level QP. For example, a flag in a slice header, PPS, SPS, or other syntax structure indicates whether or not sample values of pixels encoded in the escape mode of the palette mode are encoded independent of any unit-level QP.

FIG. 10 shows a generalized technique (1000) for decoding that includes robust decoding of pixels in escape mode of palette mode. A media decoder such as a video decoder as described with reference to FIGS. 5 and 6, or other media decoder, performs the technique (1000).

The media decoder receives (1010) encoded data for a current picture. The media decoder then decodes the current picture on a unit-by-unit basis. The units of the current picture can be CUs, macroblocks, or some other type of units. As part of the decoding the current picture, the media decoder decodes (1020) a current unit of the current picture. The media decoder checks (1030) whether to continue with a next unit of the current picture and, if so, continues by decoding the next unit (as the current unit). After decoding all of the units of the current picture, the media decoder checks (1040) whether to continue with a next picture, e.g., the next picture in a video sequence. If so, the media decoder continues by receiving encoded data for the next picture (as the current picture).

During the decoding process, for at least one unit, the decoder decodes the unit in palette mode and, as part of the palette mode decoding, decodes a sample value of the unit in an escape mode of the palette mode without any parsing dependency on a unit-level QP for the unit. Various example approaches to decoding sample values in escape mode of palette mode are detailed in the next four sections with reference to FIGS. 11-18. Other units of the current picture can be decoded in a palette mode with no escape-coded pixels and/or decoded in a non-palette mode.

The media decoder can selectively enable/disable whether sample values of escape-coded pixels are decoded without any parsing dependency on a unit-level QP. For example, a flag in a slice header, PPS, SPS, or other syntax structure indicates whether or not sample values of pixels encoded in the escape mode of the palette mode are decoded without any parsing dependency on a unit-level QP.

C. First Example Approach—Using Slice-level QP or Other "Constant" QP.

Figure 11:
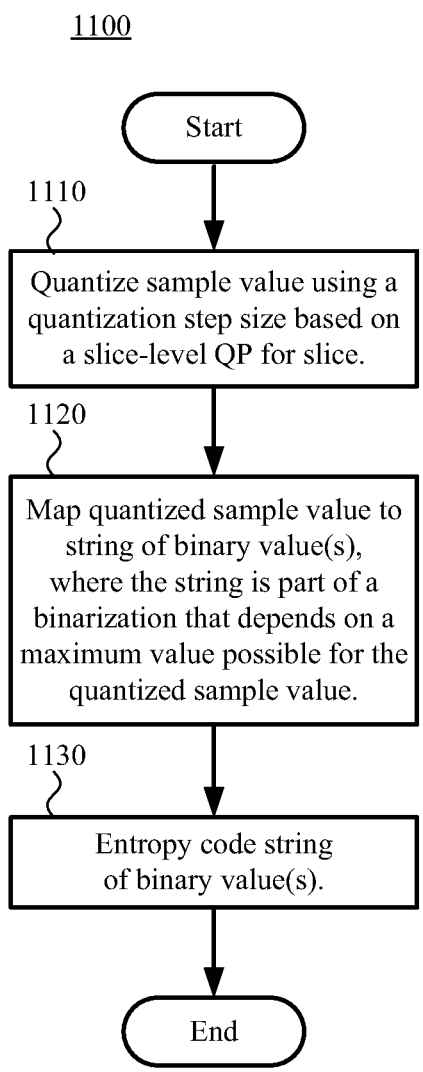
FIGS. 11 and 12 are flowcharts illustrating example techniques for encoding and decoding, respectively, of a sample value using a binarization process that depends on a slice-level QP.

FIG. 11 shows an example technique (1100) for encoding of a sample value of an escape-coded pixel in palette mode using a binarization process that depends on a slice-level QP. The example technique (1100) is an example of processing in the encoding (920) stage of the generalized technique (900) shown in FIG. 9. In the first example approach, a slice of the current picture includes the current unit (e.g., current CU).

The media encoder quantizes (1110) the sample value using a quantization step size based on a slice-level QP for the slice. For example, the slice-level QP is set using a picture-level QP for the current picture and slice-level QP for the slice. Alternatively, the slice-level QP also depends on a QP offset that applies for any sample values encoded in the escape mode of the palette mode in the slice, as described with reference to FIG. 13. The QP offset for sample values of escape-coded pixels can be conditionally signaled in a header for the slice depending on whether palette mode is enabled (that is, the QP offset is present if palette mode is enabled, and the QP offset is absent if palette mode is disabled). The slice-level QP can also vary for different blocks of a unit, depending on color component, where different color components have different QP offsets signaled at picture level and/or slice level. In example implementations, bitstream syntax does not permit a unit-level QP for a unit encoded in the palette mode with escape-coded pixels (e.g., no CU-level QP for a CU coded in palette mode with escape-coded pixels).

The media encoder maps (1120) the quantized sample value to a string of one or more binary values. The string is part of a binarization that depends on a maximum value possible for the quantized sample value, which in turn depends on the slice-level QP. Examples of binarization are described below. Alternatively, the media encoder uses some other form of binarization. The media encoder entropy codes (1130) the string of binary value(s).

Figure 12:
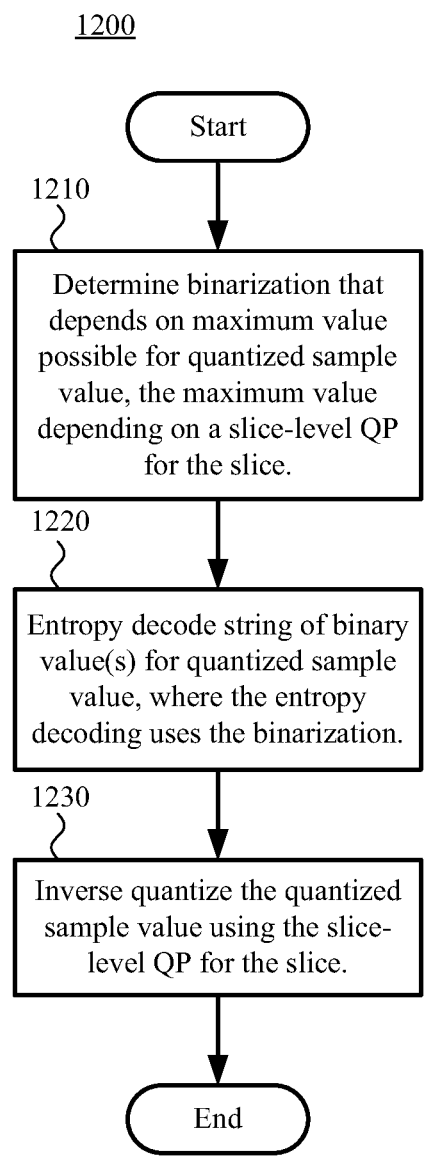

FIG. 12 shows an example technique (1200) for decoding of a sample value of an escape-coded pixel in palette mode using a binarization process that depends on a slice-level QP. The example technique (1200) is an example of processing in the decoding (1020) stage of the generalized technique (1000) shown in FIG. 10. In the first example approach, a slice of the current picture includes the current unit (e.g., current CU).

The media decoder determines (1210) a binarization that depends on a maximum value possible for a quantized sample value for the sample value. The maximum value depends on a slice-level QP for the slice. For example, the slice-level QP is reconstructed using a picture-level QP for the current picture and slice-level QP for the slice. Alternatively, the slice-level QP also depends on a QP offset that applies for any sample values decoded in the escape mode of the palette mode in the slice, as described with reference to FIG. 13. The QP offset for sample values of escape-coded pixels can be conditionally signaled in a header for the slice depending on whether palette mode is enabled (that is, the QP offset is present if palette mode is enabled, and the QP offset is absent if palette mode is disabled). The slice-level QP can also vary for different blocks of a unit, depending on color component, where different color components have different QP offsets signaled at picture level and/or slice level. In example implementations, bitstream syntax does not permit a unit-level QP for a unit decoded in the palette mode with escape-coded pixels (e.g., no CU-level QP for a CU encoded in palette mode with escape-coded pixels).

The media decoder entropy decodes (1220) a string of one or more binary values for the quantized sample value. The entropy decoding uses the binarization. Then, the media decoder inverse quantizes (1230) the quantized sample value using the slice-level QP for the slice.

In some example implementations, escape-coded pixels are encoded and decoded using a QP value that is "constant" for the CUs of a slice. The constant QP is a slice-level QP, which may depend on a slice-level QP offset signaled for escape-coded pixels of the slice, but is the same for all of the CUs of the slice. Since the QP for escape-coded pixels is fixed for the CUs of the slice, the number of binary values for strings used in arithmetic coding/decoding of sample values for escape-coded pixels is also fixed. (The number of binary values for strings depends on sample depth and QP value, which indicate the maximum possible value for quantized sample values.) Thus, when a constant, slice-level QP is used, there is no parsing dependency on CU-level QP values for sample values of escape-coded pixels. Also, when escape-coded pixels use a constant, slice-level QP, a CU-level QP offset for escape-coded pixels in palette mode need not be signaled in the bitstream.

FIG. 13 shows an example syntax structure (1300) with syntax elements for signaling slice-level QP offsets for escape-coded pixels in palette mode. In particular, FIG. 13 shows a syntax structure for a slice segment header for implementations of encoding and decoding for an extension of the H.265/HEVC standard. In the syntax structure (1300), the syntax elements palette_escape_pixel_qp_delta, palette_escape_pixel_cb_qp_offset, and palette_escape_pixel_cr_qp_offset are conditionally present. If palette mode is enabled (that is, the value of palette_mode_enabled_flag is 1), the syntax element palette_escape_pixel_qp_delta is present, and the syntax elements palette_escape_pixel_cb_qp_offset and palette_escape_pixel_cr_qp_offset may also be present (if chroma array type is not monochromatic).

The syntax element palette_escape_pixel_qp_delta specifies the QP value ("EscQpY") used for luma sample values (or other primary color component sample values) of escape-coded pixels in the slice. When not present, the value of the syntax element is inferred to be equal to 0. EscQpY is set as:

EscQpY=SliceQpY+palette_escape_pixel_qp_delta, where the value of EscQpY is constrained to be in in the range of −QpBdOffsetY to +51, inclusive, and QpBdOffsetY is defined in JCTVC-T1005-v2, which specifies an extension of the H.265/HEVC standard.

The syntax element palette_escape_pixel_cb_qp_offset specifies a difference to be added to the value of pps_cb_qp_offset when determining the QP value ("EscQpCb") used for cb color component sample values (or other secondary color component sample values) of escape-coded pixels in the slice. The value of palette_escape_pixel_cb_qp_offset is constrained to be in the range of −12 to +12, inclusive. When not present, the syntax element is inferred to be equal to 0. The value of pps_cb_qp_offset+palette_escape_pixel_cb_qp_offset is constrained to be in the range of −12 to +12, inclusive. EscQpCb is set as:

EscQpCb=Clip3(−QpBdOffsetC, 57, EscQpY+pps_cb_qp_offset+palette_escape_pixel_cb_qp_offset), where Clip3(a, b, c) is a function that clips c to be in the range of a and b, inclusive, and where QpBdOffsetC and pps_cb_qp_offset are defined in JCTVC-T1005-v2.

Similarly, the syntax element palette_escape_pixel_cr_qp_offset specifies a difference to be added to the value of pps_cr_qp_offset when determining the QP value ("EscQpCr") used for cr color component sample values (or other secondary color component sample values) of escape-coded pixels in the slice. The value of palette_escape_pixel_cr_qp_offset is constrained to be in the range of −12 to +12, inclusive. When not present, the syntax element is inferred to be equal to 0. The value of pps_cr_qp_offset+palette_escape_pixel_cr_qp_offset is constrained to be in the range of −12 to +12, inclusive. EscQpCr is set as:

EscQpCr=Clip3(−QpBdOffsetC, 57, EscQpY+pps_cr_qp_offset+palette_escape_pixel_cr_qp_offset), where pps_cr_qp_offset is defined in JCTVC-T1005-v2.

During decoding, the slice-level QP ("qP") that is used for inverse quantization of quantized sample values of escape-coded pixels is defined for different color components, depending on index cIdx of color component, as:

If cIdx is equal to 0, qP=max(0, EscQpY);

Otherwise, if cIdx is equal to 1, qP=max(0, EscQpCb); and

Otherwise (cIdx is equal to 2), qP=max(0, EscQpCr).

The syntax element palette_escape_val represents a quantized sample value of an escape-coded pixel. The binarization process for palette_escape_val proceeds as follows. The binarization process accepts as inputs a color component index cIdx and a flag cu_transquant_bypass_flag, which indicates whether transform and quantization are bypassed for a CU. As output, the binarization process produces a binarization (set of possible strings of binary values) for a palette_escape_val syntax element. The media decoder derives the variable bitDepth as:

bitDepth=(cIdx==0)?BitDepthY:BitDepthC, where BitDepthY indicates the bit depth for a primary color component, and BitDepthC indicates the bit depth for secondary color components.

If cu_transquant_bypass_flag is true, the media decoder derives the binarization of palette_escape_val by invoking the fixed-length binarization process specified in section 9.3.3.5 of JCTVC-T1005-v2, with the input parameter set to (1<<bitDepth)−1.

On the other hand, if cu_transquant_bypass_flag is false, the media decoder derives the binarization of palette_escape_val as follows. The media decoder derives the quantization parameter qP as follows:

qP=(cIdx==0)?EscQpY:((cIdx==1)EscQpCb?EscQpCr).

The media decoder derives the variable bdShift as follows:

bdShift=14+qP/6.

The list quantScale[ ] is specified as quantScale[k]={26214, 23302, 20560, 18396, 16384, 14564}, for k=0 . . . 5. The media decoder derives the maximum parameter cMax for a truncated binary ("TB") binarization process as follows:

cMax=(((1<<bitDepth)−1)*quantScale[qP%6]+(1<<(bdShift−1)))>>bdShift.

Finally, to produce the binarization for the palette_escape_value syntax element, the media decoder invokes the TB binarization process specified in section 9.3.3.6 of JCTVC-T1005-v2, with cMax as input.

In the example implementations, coding/decoding of quantized sample values for escape-coded pixels uses slice-level QP. Alternatively, instead of using a slice-level QP, the escape mode for palette mode uses another value of QP that is "constant" for purposes of coding/decoding of units of a slice. For example, the constant QP is a picture-level QP (which may vary between color components), a tile-specific QP (which may vary between color components), or another level of QP.

In the example implementations, sample values for escape-coded pixels are always encoded and decoded using a slice-level QP or other constant QP. Alternatively, sample values for escape-coded pixels may be encoded/decoded using a constant QP or using a CU-level QP, depending on a setting. For example, a high-level flag (in a slice header, PPS, SPS, or other syntax structure) controls whether sample values for escape-coded pixels are encoded/decoded using a constant QP or CU-level QP. This flag, in turn, controls whether the slice-level QP offset(s) for escape-coded pixels are present or absent in the bitstream, and controls whether CU-level QP offset(s) for escape-coded pixels is present or absent in the bitstream.

D. Second Example Approach—Binarization According to Sample Depth.

Figure 14:
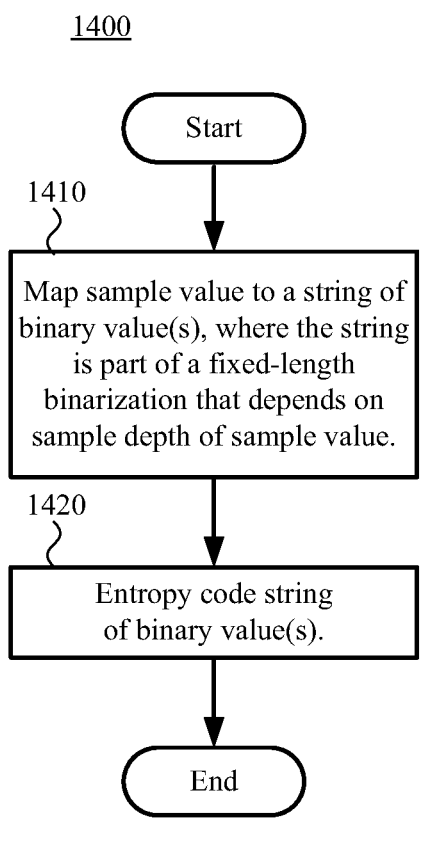
FIGS. 14 and 15 are flowcharts illustrating example techniques for encoding and decoding, respectively, of a sample value using a binarization process that depends on sample depth of sample values.

FIG. 14 shows an example technique (1400) for encoding of a sample value of an escape-coded pixel in palette mode using a binarization process that depends on sample depth of sample values (that is, number of bits per sample value). The example technique (1400) is an example of processing in the encoding (920) stage of the generalized technique (900) shown in FIG. 9. The example technique (1400) is lossless—the sample value of the escape-coded pixel is not quantized.

The media encoder maps (1410) the sample value to a string of one or more binary values. The string is part of a fixed-length binarization that depends on sample depth of the sample value. Examples of fixed-length binarization are described below. Alternatively, the media encoder uses some other form of binarization. The media encoder entropy codes (1420) the string of binary value(s).

Figure 15:
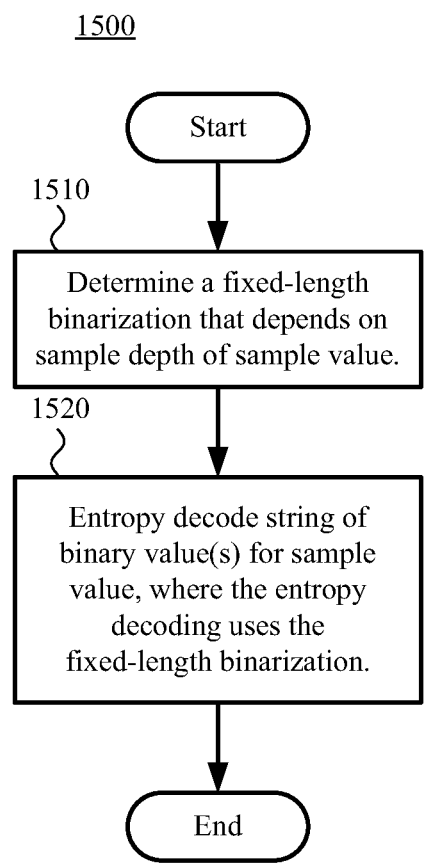

FIG. 15 shows an example technique (1500) for decoding of a sample value of an escape-coded pixel in palette mode using a binarization process that depends on sample depth of sample values (that is, number of bits per sample value). The example technique (1500) is an example of processing in the decoding (1020) stage of the generalized technique (1000) shown in FIG. 10. The example technique (1500) is part of a lossless process—the sample value of the escape-coded pixel is not inverse quantized.

The media decoder determines (1510) a fixed-length binarization that depends on sample depth of the sample value. Examples of fixed-length binarization are described below. The media decoder entropy decodes (1220) a string of one or more binary values for the sample value. The entropy decoding uses the fixed-length binarization.

In some example implementations, the variable bitDepth indicates the sample depth of the sample value. The media decoder derives the variable bitDepth as:

bitDepth=(cIdx==0)?BitDepthY:BitDepthC, where BitDepthY indicates the bit depth for a primary color component, and BitDepthC indicates the bit depth for secondary color components. The media decoder derives the binarization of the sample value (for the syntx element palette_escape_val) by invoking the fixed-length binarization process specified in section 9.3.3.5 of JCTVC-T1005-v2, with the input parameter set to (1<<bitDepth)−1.

Since sample depth is typically defined at a high level (e.g., for a video sequence), the input for the binarization process is fixed. Alternatively, a sample value of an escape-coded pixel is encoded/decoded using a binarization process that depends on another fixed rule.

E. Third and Fourth Example Approaches—$k^{th}$-order Exp-Golomb Binarization.

Figure 16:
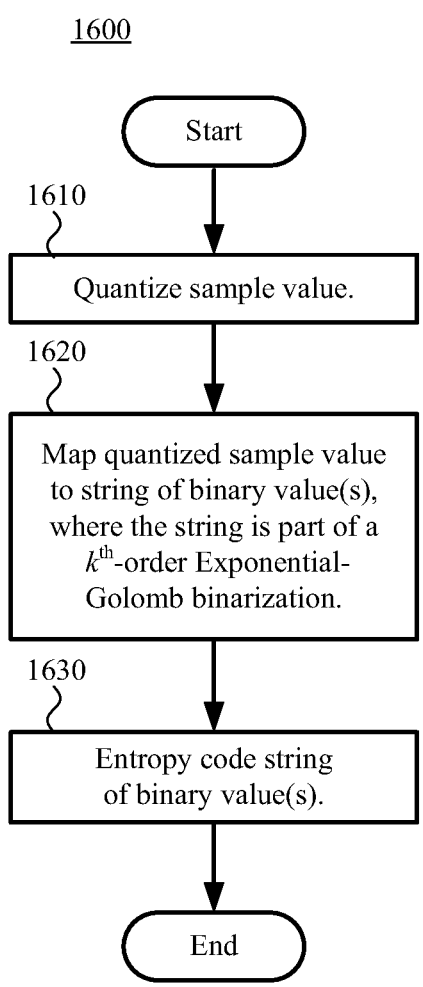
FIGS. 16 and 17 are flowcharts illustrating example techniques for encoding and decoding, respectively, of a sample value using a $k^{th}$-order Exponential-Golomb binarization process.

FIG. 16 shows an example technique (1600) for encoding of a sample value of an escape-coded pixel in palette mode using a $k^{th}$-order Exponential-Golomb binarization process. The example technique (1600) is an example of processing in the encoding (920) stage of the generalized technique (900) shown in FIG. 9.

The media encoder quantizes (1610) the sample value using a quantization step size based on a slice-level QP for the slice, unit-level QP for the unit, or other QP. For example, the QP is set using a picture-level QP for the current picture, slice-level QP offset for the slice, and/or unit-level QP offset for the unit. (The unit-level QP offset can be used when setting a unit-specific QP that is used for quantization, even if the unit-level QP offset does not affect parsing, as in the QP-independent variation described below.) The QP can also vary for different blocks of a unit, depending on color component, e.g., where different color components have different QP offsets signaled at picture level and/or slice level.

The media encoder maps (1620) the quantized sample value to a string of one or more binary values. The string is part of a $k^{th}$-order Exponential-Golomb binarization that depends on an input value k. Examples of $k^{th}$-order Exponential-Golomb binarization are described below. Alternatively, the media encoder uses some other form of binarization. The media encoder entropy codes (1630) the string of binary value(s).

Figure 17:
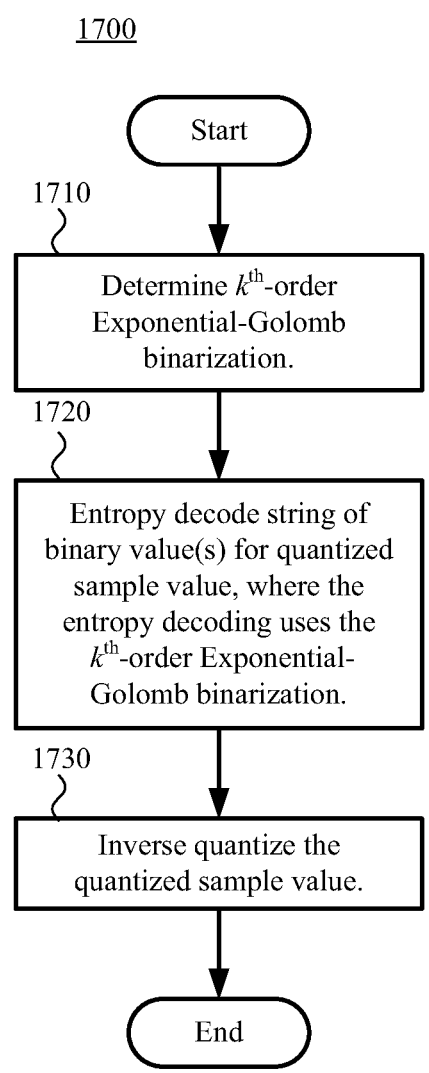

FIG. 17 shows an example technique (1700) for decoding of a sample value of an escape-coded pixel in palette mode using a $k^{th}$-order Exponential-Golomb binarization process. The example technique (1700) is an example of processing in the decoding (1020) stage of the generalized technique (1000) shown in FIG. 10.

The media decoder determines (1710) a $k^{th}$-order Exponential-Golomb binarization, which depends on an input value k. The media decoder entropy decodes (1720) a string of one or more binary values for the quantized sample value. The entropy decoding uses the $k^{th}$-order Exponential-Golomb binarization. Then, the media decoder inverse quantizes (1730) the quantized sample value using a quantization step size based on a slice-level QP for the slice, unit-level QP for the unit, or other QP. For example, the QP is reconstructed using a picture-level QP for the current picture, slice-level QP offset for the slice, and/or unit-level QP offset for the unit. (The unit-level QP offset can be used when setting a unit-specific QP that is used for quantization, even if the unit-level QP offset does not affect parsing, as in the QP-independent variation described below.) The QP can also vary for different blocks of a unit, depending on color component, e.g., where different color components have different QP offsets signaled at picture level and/or slice level.

FIG. 18 shows a pseudocode listing (1800) for an example technique for a $k^{th}$-order Exponential-Golomb binarization process. The $k^{th}$-order Exponential-Golomb binarization process produces a binarization that associates each possible value (symbolVal, as shown in FIG. 18) with a corresponding string of binary values. The string produced in the binarization process for each value symbolVal is specified as shown in FIG. 18. The function Abs(X) returns the absolute value of X. Each call of the function put(X), with X being equal to 0 or 1, adds the binary value X at the end of the string of binary values.

1. QP-independent Binarization Process.

In some example implementations, the value of k for the $k^{th}$-order Exponential-Golomb binarization is pre-defined for the decoding. For example, the value of k is pre-determined or hard-coded for encoding and decoding of sample values of escape-coded pixels. Or, the value of k is set by an encoder, signaled in a slice header, PPS, SPS, or other syntax structure, and used by the decoder as input to the $k^{th}$-order Exponential-Golomb binarization process. Since the value of k is pre-defined, the binarization process for sample values of escape-coded pixels in palette mode is QP-independent.

The value of k depends on implementation. In general, a smaller value of k, such as 0 or 1, is favored when most quantized sample values are zero or close to zero. On the other hand, a larger value of k, such as 2, 3, or 4, is favored when quantized sample values are more evenly distributed among non-zero values in a range, even if values closer to zero are more common. In some example implementation, k is 3.

In this approach, the binarization process for palette_escape_val proceeds as follows. The binarization process accepts as inputs a color component index cIdx and a flag cu_transquant_bypass_flag, which indicates whether transform and quantization are bypassed for a CU. As output, the binarization process produces a binarization (set of possible strings of binary values) for a palette_escape_val syntax element. The media decoder derives the variable bitDepth as:

bitDepth=(cIdx==0)?BitDepthY:BitDepthC, where BitDepthY indicates the bit depth for a primary color component, and BitDepthC indicates the bit depth for secondary color components.

If cu_transquant_bypass_flag is true, the media decoder derives the binarization of palette_escape_val by invoking the fixed-length binarization process specified in section 9.3.3.5 of JCTVC-T1005-v2, with the input parameter set to (1<<bitDepth)−1.

On the other hand, if cu_transquant_bypass_flag is false, the media decoder derives the $k^{th}$-order Exponential-Golomb binarization of palette_escape_val as shown in FIG. 18, with k equal to 3.

2. QP-dependent Binarization Process.

In some example implementations, the value of k for the $k^{th}$-order Exponential-Golomb binarization is derived during decoding depending on QP values. For example, when the current unit is part of a slice of the current picture, the value of k can be set based at least in part on a slice-level QP for the slice. Thus, the order of the $k^{th}$-order Exponential-Golomb binarization is adaptive, depending on slice-level QP. When QP is high, the value of k can be set to a lower value such as 0 or 1, since most quantized sample values are expected to be zero or close to zero, in a relatively small range of values. On the other hand, when QP is low, the value of k can be set to a higher value such as 2, 3, or 4, since more non-zero quantized sample values are expected, and those non-zero quantized sample values may be distributed over a larger range of values.

In this approach, the binarization process for palette_escape_val proceeds as follows. The binarization process accepts as inputs a color component index cIdx and a flag cu_transquant_bypass_flag, which indicates whether transform and quantization are bypassed for a CU. As output, the binarization process produces a binarization (set of possible strings of binary values) for a palette_escape_val syntax element. The media decoder derives the variable bitDepth as: bitDepth=(cIdx==0)?BitDepthY:BitDepthC.

If cu_transquant_bypass_flag is true, the media decoder derives the binarization of palette_escape_val by invoking the fixed-length binarization process specified in section 9.3.3.5 of JCTVC-T1005-v2, with the input parameter set to (1<<bitDepth)−1.

On the other hand, if cu_transquant_bypass_flag is false, the media decoder derives the binarization of palette_escape_val as follows. The media decoder derives the quantization parameter qP as follows:
if cIdx==0, qP=SliceQp$_Y$
otherwise, if cIdx==1,
qP=Clip3(−QpBdOffset$_C$, 57, SliceQp$_Y$+pps_cb_qp_offset+slice_cb_qp_offset) otherwise (cIdx==2),
qP=Clip3(−QpBdOffset$_C$, 57, SliceQp$_Y$+pps_cr_qp_offset+slice_cr_qp_offset)
Alternatively, the QP value qP is set in some other way. For example:
Qp$_Y$=SliceQpy
qPi$_{Cb}$=Clip3(−QpBdOffset$_C$, 57, Qp$_Y$+pps_cb_qp_offset+slice_cb_qp_offset)
qPi$_{Cr}$=Clip3(−QpBdOffset$_C$, 57, Qp$_Y$+pps_cr_qp_offset+slice_cr_qp_offset)
If ChromaArrayType is equal to 1, the variables qP$_{Cb}$ and qP$_{Cr}$ are set equal to the value of QpC as specified in Table 8-10 of JCTVC-T1005-v2, based on the index qPi equal to qPi$_{Cb}$ and qPi$_{Cr}$, respectively. Otherwise, the variables qP$_{Cb}$ and qP$_{Cr}$ are set equal to Min(qPi, 51), based on the index qPi equal to qPi$_{Cb}$ and qPi$_{Cr}$, respectively. After that:
Qp'$_Y$=Qp$_Y$+QpBdOffset$_Y$
Qp'$_{Cb}$=qP$_{Cb}$+QpBdOffset$_C$
Qp'$_{Cr}$=qP$_{Cr}$+QpBdOffset$_C$
Finally, the appropriate QP for the sample value is set depending on color component. If the cIdx is equal to 0, qP is set to Qp'$_Y$. If cIdx is equal to 1, qP is set to Qp'$_{Cb}$. If cIdx is equal to 2, qP is set to Qp'$_{Cr}$.

The media decoder derives the variable bdShift as follows:
bdShift=14+qP/6.
The list quantScale[ ] is specified as quantScale[k]={26214, 23302, 20560, 18396, 16384, 14564}, for k=0 . . . 5. The media decoder derives the maximum parameter cMax for a truncated binary ("TB") binarization process as follows:
cMax=(((1<<bitDepth)−1)*quantScale[qP%6]+(1<<(bdShift−1)))>>bdShift.

Thus, cMax indicates the maximum possible value for a quantized sample value (of the given color component) of the escape-coded pixel in palette mode.

Then, the media decoder determines the value of k ("order") from cMax according to the following pseudo-code:
order=0;
while (cMax>1) {order++; cMax>>=1;}
The value of order can be further modified by adding a fixed offset, such as 0, 1, 2, −1, −2, etc., with order being clipped to be greater than or equal to zero. Alternatively, to calculate a value of order that tends to be slightly higher, the media decoder determines the value of k (order) from cMax according to the following pseudo-code:
order=0;
while (cMax>0) {order++; cMax>>=1;}
Finally, the media decoder derives the $k^{th}$-order Exponential-Golomb binarization of palette_escape_val as shown in FIG. 18, with k equal to the value "order" as derived above.

F. Other Example Approaches—Combinations.

The preceding approaches can be used in combination. For example, a media encoder determines whether a unit is encoded in a lossless manner or lossy manner. If the unit is encoded in a lossless manner, the media encoder uses the approach described in section V.D. Otherwise (the unit being encoded in a lossy manner), the media encoder uses one of the approaches described in section V.E. A corresponding media decoder determines whether a unit has been encoded in a lossless manner or lossy manner. If the unit has been encoded in a lossless manner, the media decoder uses the approach described in section V.D. Otherwise (the unit having been encoded in a lossy manner), the media decoder uses one of the approaches described in section V.E.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a computer system, a method comprising:
receiving a picture; and
encoding the picture, wherein the encoding the picture includes encoding a unit of the picture in a palette mode, the unit being encoded in a lossy manner, and wherein the encoding the unit in the palette mode includes, for an escape mode of the palette mode:
determining a unit-level quantization parameter for the unit, the unit-level quantization parameter being indicated at least in part by a picture-level quantization parameter for the picture, a slice-level quantization parameter offset for a slice of the picture, and a unit-level quantization parameter offset for the unit;
quantizing a sample value for a color component of the unit; and
encoding the quantized sample value for the color component of the unit using a $k^{th}$-order Exponential-Golomb binarization of a syntax element that represents the quantized sample value for the color component of the unit, wherein k is a pre-determined number, wherein the $k^{th}$-order Exponential-Golomb binarization is independent of the unit-level quantization parameter for the unit, the color component of the unit being indicated by a color component index cIdx for the color component, and the quantized sample value for the color component of the unit being constrained by a value equal to (1<<BitDepth)−1, wherein BitDepth represents a sample depth that applies for the color component that is indicated by the color component index cIdx, and wherein the encoding the quantized sample values includes:

mapping the quantized sample value for the color component of the unit to a string of one or more binary values, wherein the string of one or more binary values is a part of the $k^{th}$-order Exponential-Golomb binarization; and entropy coding the string of one or more binary values.

2. The method of claim 1, wherein the unit is a coding unit in the slice of the picture.

3. The method of claim 1, wherein the picture is received from a video source configured to produce a video sequence of a screen capture content, the video sequence comprising the picture.

4. The method of claim 1, wherein another syntax element indicates whether transform and quantization are bypassed for the unit, and wherein the other syntax element indicates a result of determining whether the unit is encoded in a lossless manner or the lossy manner.

5. One or more non-transitory computer-readable media having stored thereon encoded data for a picture, the encoded data including a syntax element that represents a quantized sample value for a color component of a unit of the picture, the unit having been encoded in a lossy manner, the encoded data being organized to facilitate decoding of the picture by operations comprising decoding the unit in a palette mode, including, for an escape mode of the palette mode:

determining a unit-level quantization parameter for the unit, the unit-level quantization parameter being based at least in part on a picture-level quantization parameter for the picture, a slice-level quantization parameter offset for a slice of the picture, and a unit-level quantization parameter offset for the unit;

decoding the quantized sample value for the color component of the unit using a $k^{th}$-order Exponential-Golomb binarization of the syntax element without any parsing dependency on the unit-level quantization parameter for the unit, wherein k is a pre-determined number, the color component of the unit being indicated by a color component index cIdx for the color component, and the quantized sample value for the color component of the unit being constrained by a value equal to (1<<BitDepth)−1, wherein BitDepth represents a sample depth that applies for the color component that is indicated by the color component index cIdx, and wherein the decoding includes:

determining the $k^{th}$-order Exponential-Golomb binarization by invoking a $k^{th}$-order Exponential-Golomb binarization process; and entropy decoding a string of one or more binary values for the quantized sample value for the color component of the unit, wherein the entropy decoding uses the $k^{th}$-order Exponential-Golomb binarization; and inverse quantizing the quantized sample value for the color component of the unit.

6. The one or more computer-readable media of claim 5, wherein the unit is a coding unit in the slice of the picture.

7. The one or more computer-readable media of claim 5, wherein k is 3.

8. The one or more computer-readable media of claim 5, wherein another syntax element indicates whether transform and quantization have been bypassed for the unit.

9. The one or more computer-readable media of claim 8, wherein the decoding the unit further includes, based on the other syntax element, determining whether the unit has been encoded in a lossless manner or the lossy manner.

10. A computer system comprising a processor and memory that implement a video decoder system, the video decoder system comprising:

a buffer, implemented using at least some of the memory, configured to receive encoded data for a picture; and a video decoder configured to decode the picture with operations that include decoding a unit of the picture in a palette mode, the unit having been encoded in a lossy manner, wherein the decoding the unit in the palette mode includes, for an escape mode of the palette mode:

determining a unit-level quantization parameter for the unit, the unit-level quantization parameter being based at least in part on a picture-level quantization parameter for the picture, a slice-level quantization parameter offset for a slice of the picture, and a unit-level quantization parameter offset for the unit;

decoding a quantized sample value for a color component of the unit using a $k^{th}$-order Exponential-Golomb binarization of a syntax element that represents the quantized sample value for the color component of the unit without any parsing dependency on the unit-level quantization parameter for the unit, wherein k is a pre-determined number, the color component of the unit being indicated by a color component index cIdx for the color component, and the quantized sample value for the color component of the unit being constrained by a value equal to (1<<BitDepth)−1, wherein BitDepth represents a sample depth that applies for the color component that is indicated by the color component index cIdx, and wherein the decoding includes:

determining the $k^{th}$-order Exponential-Golomb binarization by invoking a $k^{th}$-order Exponential-Golomb binarization process; and entropy decoding a string of one or more binary values for the quantized sample value for the color component of the unit, wherein the entropy decoding uses the $k^{th}$-order Exponential-Golomb binarization; and inverse quantizing the quantized sample value for the color component of the unit.

11. The computer system of claim 10, wherein the unit is a coding unit in the slice of the picture.

12. The computer system of claim 10, wherein k is 3.

13. The computer system of claim 10, wherein another syntax element indicates whether transform and quantization have been bypassed for the unit.

14. The computer system of claim 13, wherein the decoding the unit further includes, based on the other syntax element, determining whether the unit has been encoded in a lossless manner or the lossy manner.

15. The computer system of claim 10, wherein the unit-level quantization parameter for the unit is for the color component of the unit, and wherein a different color component of the unit has a different unit-level quantization parameter based at least in part on a picture-level quantization parameter offset for the different color component and/or a different slice-level quantization parameter offset for the different color component.

16. The method of claim 1, wherein the unit-level quantization parameter for the unit is for the color component of the unit, and wherein a different color component of the unit has a different unit-level quantization parameter indicated at least in part by a picture-level quantization parameter offset for the different color component and/or a different slice-level quantization parameter offset for the different color component.

17. The one or more computer-readable media of claim 5, wherein the unit-level quantization parameter for the unit is for the color component of the unit, and wherein a different color component of the unit has a different unit-level quantization parameter based at least in part on a picture-level quantization parameter offset for the different color component and/or a different slice-level quantization parameter offset for the different color component.

* * * * *